US012399998B2

United States Patent
Kumar et al.

(10) Patent No.: US 12,399,998 B2
(45) Date of Patent: Aug. 26, 2025

(54) COMPUTING SYSTEMS EMPLOYING MEASUREMENT OF BOOT COMPONENTS, SUCH AS PRIOR TO TRUSTED PLATFORM MODULE (TPM) AVAILABILITY, FOR ENHANCED BOOT SECURITY, AND RELATED METHODS

(71) Applicant: Ampere Computing LLC, Santa Clara, CA (US)

(72) Inventors: Vivek Kumar, Bangalore Karnataka (IN); Harb Ali Abdulhamid, Raleigh, NC (US); Loc Ho, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 253 days.

(21) Appl. No.: 17/901,184

(22) Filed: Sep. 1, 2022

(65) Prior Publication Data

US 2023/0078138 A1 Mar. 16, 2023

Related U.S. Application Data

(60) Provisional application No. 63/242,858, filed on Sep. 10, 2021.

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC .............. G06F 21/575; G06F 2221/034
USPC .......................................................... 726/22
See application file for complete search history.

(56) References Cited

U.S. PATENT DOCUMENTS

| 5,502,836 | A | * | 3/1996 | Hale | ...................... | G11C 29/74 |
| | | | | | | 711/170 |
| 7,921,286 | B2 | * | 4/2011 | Wooten | ................... | G06F 21/57 |
| | | | | | | 713/165 |
| 9,471,313 | B1 | * | 10/2016 | Busaba | ............... | G06F 9/30087 |
| 10,943,013 | B2 | * | 3/2021 | Diamant | ............... | H04L 9/0897 |

(Continued)

FOREIGN PATENT DOCUMENTS

WO WO-2017182088 A1 * 10/2017 ........... G06F 21/572

OTHER PUBLICATIONS

ISO/IEC 11889-1:2015(E), Part 1: Architecture, pp. 1-83 (Apr. 2016) (Year: 2016).*

*Primary Examiner* — David P Zarka
(74) *Attorney, Agent, or Firm* — Withrow & Terranova, PLLC

(57) ABSTRACT

In exemplary aspects, to extend the measured boot process performed by a trusted platform module (TPM) circuit to earlier, primitive boot components that are processed before the TPM circuit becomes available to perform boot measurements, a secure boot processing system is configured to measure earlier, primitive boot components. The measured primitive boot components are used to update a virtual configuration register (CR) value in a final virtual CR. The TPM circuit uses the final virtual CR value as an initial starting CR value to measure subsequent boot components to provide end-to-end security for boot operations. In this manner, the final virtual CR value protects boot integrity of boot operations of its CPU even if they occur before availability of the TPM circuit.

34 Claims, 7 Drawing Sheets

(56) References Cited

U.S. PATENT DOCUMENTS

Figure 1:
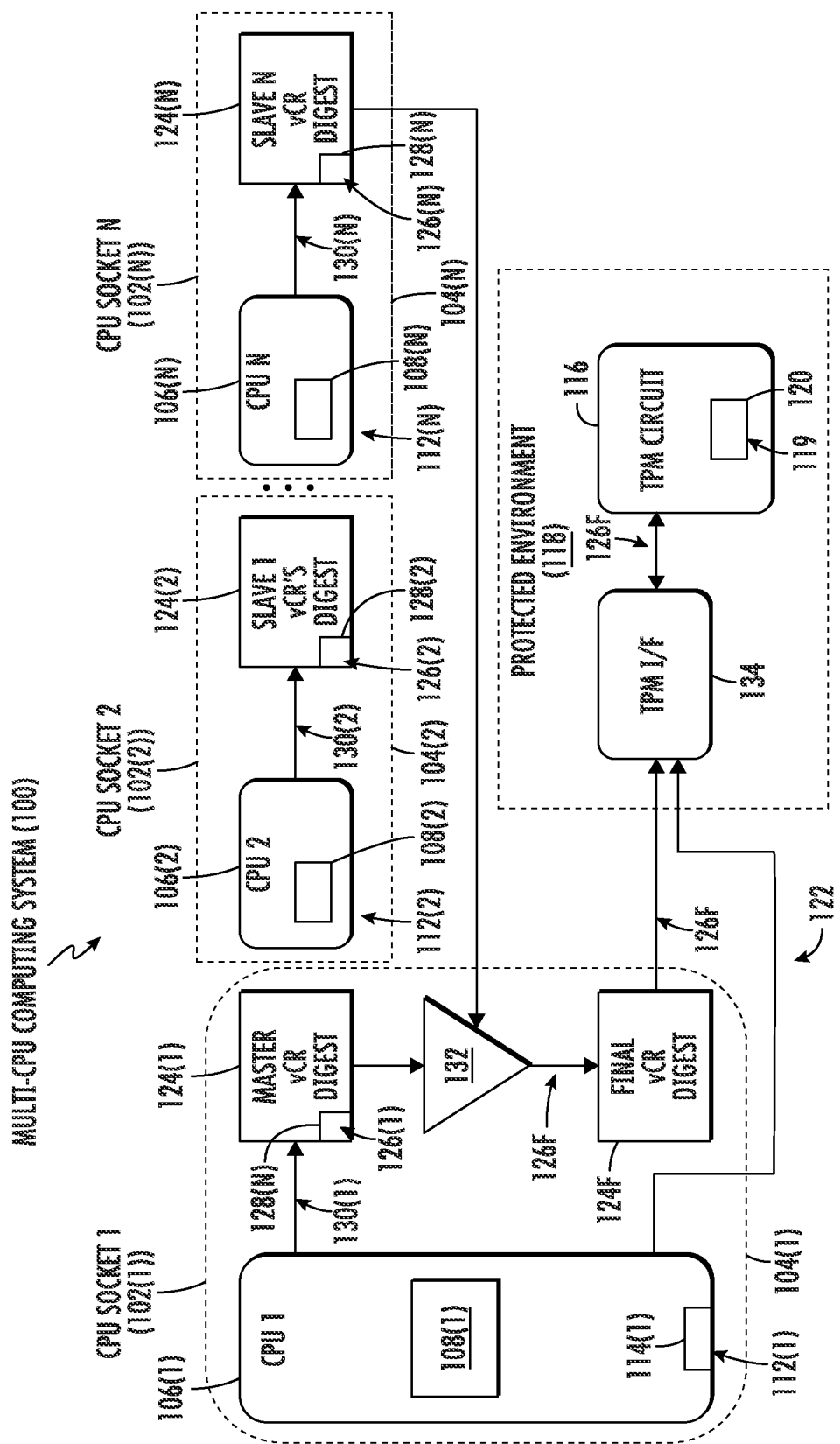

| | | | | |
|---|---|---|---|---|
| 2003/0074548 | A1* | 4/2003 | Cromer | G06F 21/575 |
| | | | | 713/1 |
| 2005/0283601 | A1* | 12/2005 | Tahan | G06F 21/575 |
| | | | | 713/2 |
| 2006/0075223 | A1* | 4/2006 | Bade | G06F 21/57 |
| | | | | 713/162 |
| 2006/0155988 | A1* | 7/2006 | Hunter | G06F 21/575 |
| | | | | 713/164 |
| 2008/0301466 | A1* | 12/2008 | Hsu | G06F 8/65 |
| | | | | 713/189 |
| 2009/0070598 | A1* | 3/2009 | Cromer | G06F 21/575 |
| | | | | 713/193 |
| 2011/0213953 | A1* | 9/2011 | Challener | G06F 21/57 |
| | | | | 713/2 |
| 2011/0276795 | A1* | 11/2011 | Nicolson | G06F 21/575 |
| | | | | 713/2 |
| 2015/0149751 | A1* | 5/2015 | Nemiroff | G06F 21/575 |
| | | | | 713/2 |
| 2020/0167474 | A1* | 5/2020 | Goldman | H04L 9/3247 |
| 2022/0201014 | A1* | 6/2022 | Saha | H04L 63/1425 |
| 2022/0284105 | A1* | 9/2022 | Krishnegowda | G06F 21/575 |
| 2022/0407714 | A1* | 12/2022 | Grobelny | G06F 8/71 |
| 2023/0078138 | A1* | 3/2023 | Kumar | G06F 21/575 |
| | | | | 726/22 |

\* cited by examiner

COMPUTING SYSTEMS EMPLOYING MEASUREMENT OF BOOT COMPONENTS, SUCH AS PRIOR TO TRUSTED PLATFORM MODULE (TPM) AVAILABILITY, FOR ENHANCED BOOT SECURITY, AND RELATED METHODS

PRIORITY CLAIM

The present application claims priority to U.S. Provisional Patent Application Ser. No. 63/242,858, filed on Sep. 10, 2021, and entitled "COMPUTING SYSTEMS EMPLOYING MEASUREMENT OF BOOT COMPONENTS, SUCH AS PRIOR TO TRUSTED PLATFORM MODULE (TPM) AVAILABILITY, FOR ENHANCED BOOT SECURITY, AND RELATED METHODS," the contents of which are incorporated herein by reference in its entirety.

FIELD OF THE DISCLOSURE

The technology of the disclosure relates to computing systems employing one or more central processing units (CPUs), and more particularly boot-up operations in the CPUs.

BACKGROUND

Computing systems include one or more central processing units (CPUs). The CPUs are provided as integrated circuit (IC) chips (also called "CPU chips") that are mounted on a circuit board. The computing system can also include other computing resources mounted on the same or a coupled circuit board, such as boot storage, memory, and interfacing circuits. For example, if the computing system is employed as a computer server, the computing system can be provided on a circuit board as server blade.

The computing system undergoes as start-up process known as a "boot" or "boot-up" process when a power cycle occurs or a reset is performed. During a boot process, various hardware components and software processes in the computing system are initialized and other boot-up operations are performed to prepare these components and processes to be able to perform tasks according to operating system and application software executed by a CPU. A computing system may include a separate boot processor that loads in and executes a boot program code to perform lower-level boot-up operations to prepare the hardware and software components in the computing system to be utilized. It is usually desired for the boot program code to be able to be changed and be upgraded or updated over time, so the boot program code is typically loaded from a boot memory, such as a programmable read-only memory (ROM), that is separate and apart from the boot processor. When the boot processor undergoes a reset, the boot processor has a lower-level bootloader program code that can be executed to load in a boot program code from the boot memory. In this manner, the boot program code can be updated over time. The boot processor executes the boot program code to perform boot-up operations, including but not limited to initialization of clock circuits, power controls system, interfaces, memory systems, and loading in basic input/output system (BIOS) firmware to be executed by the CPU to perform CPU-specific boot-up operations.

It is important that the computing system is designed to include a secure boot-up system to avoid unauthorized software and physical attacks into the resources of the CPU in a computing system. This is known as "secured boot."

One example of such an attack is to obtain access to internal memory of the computing system, which may provide information on the operation of the CPU. It is also important to prevent physical attacks during a boot-up process of a computing system. Thus, as part of a secure boot-up design for a computing system, it is important that the computing system have the capability to determine if the boot-up processes are behaving in an expected manner and to detect any behaviors that are unexpected. For example, loading in an unauthorized modified version of boot program code from boot memory would be an unexpected behavior. If a third party can modify the boot program code such that the boot process of the computing system executes the modified boot program code without detecting the modification, the third party can alter and control the boot-up operations of the computing system. These altered boot-up operations can include other tampering into the operations of the computing system that can make the CPU vulnerable to other attacks.

The Trusted Platform Module (TPM) standard ISO/IEC 11889 is based on various specifications defined by the Trusted Computing Group (TCG) to provide a broad range of security features through use of cryptographic keys to secure hardware in computing systems. The TPM could be implemented in a computing system as a separate chip included in a computing system (e.g., on the same PCB as the CPU) or provided as an integrated function into the same die or chip of the CPU as TPM firmware implementation. TPM can be employed to enable an implementation of "measured boot." Measured boot is an extra layer of security that is complementary to a secure boot process in a computing system. Secure boot relies on local attestation and authentication of the firmware binaries loaded into the computing system in a boot-up operation and executed to continue to perform boot-up tasks in a boot-up operation. However, measured boot relies on remote or local attestation (i.e., measurement) of the platform integrity of the computing system. Examples of validation of platform integrity include validating boot flow (i.e., order of image load and boot related events), validation of boot configuration, validation of platform configuration (e.g., interfaces), and validation of platform devices (e.g., read-only memories (ROMs)). These boot integrity measurements are updated in platform configuration registers (PCRs) of a TPM module (e.g., implemented in a separate co-processor or a firmware TPM (FTPM) on a CPU) that are secure to the TPM, and that can be used to determine intrusions. If the value in the CR does not match an expected value at each stage of the boot-up process, this means one or more boot components of the computing system may have been compromised. To update the PCR in a boot-up operation, the TPM is requested to perform a boot measurement on a new (next) boot component to be measured. The TPM performs a boot measurement of a boot component in one example by taking a digest (i.e., a one-way hash) of the boot component using an algorithm (e.g., SHA-1) to create a fixed digest value. The boot measurement results in a PCR value that is used to update the existing PCR value (i.e., stored in the PCR). In this regard, a digest is taken of the existing PCR value concatenated with PCR value generated for the measured boot component to create a new PCR value. The new PCR value is stored overtop the prior, existing PCR value in the PCR. The PCR value can be used to verify the integrity of the boot system, because the owner of the computing system will know the correct PCR value for each stage of the boot-up operation. In this manner, an infinite number of boot measurements can be represented in a single PCR value stored in the PCR with no boot measurements having to be discarded to make room for newer boot measurements.

However, the TPM resource that is used to perform the measured boot for attestation of platform integrity may not be available as a resource in the computing system during initial stages of a boot-up operation. The TPM resource has to be brought up in a protective environment as part of a boot-up operation after initial stages and configuration boot-up tasks are performed that are necessary in order for the TPM resource to be brought up and made available. Thus, the TPM may not be available to be used to measure the platform integrity of the computing system for early boot-up tasks and operations.

SUMMARY

Aspects disclosed herein include computing systems employing measurement of boot components, such as prior to trusted platform module (TPM) availability, for enhanced security. Related methods and computer-readable media are also disclosed. The computing system includes one or more central processing unit (CPUs) that each include one or more CPU cores. For example, the computing system may be a multi-socketed computing system that includes multiple CPU sockets each with a dedicated CPU. A CPU socket includes a secure boot processing system that can include one or more processors that perform boot-up operations in response to the computer system being powered on or reset (referred to as "power-on reset" (POR)) to provide a secured boot process. If the computing system is a multi-CPU computing system, a CPU of one CPU socket may be designated as a master CPU to coordinate boot-up operations. The computing system also includes a Trusted Platform Module (TPM) circuit (e.g., as a separate co-processor or firmware resource in a CPU) that, once initialized in boot-up operations and available as a resource, can provide boot measurements. The TPM circuit is configured to perform and record boot measurements of boot components in the computing system based on a digest (e.g., one-way hash) to generate an updated configuration register (CR) value as part of a measured boot process to enhance platform integrity. For example, a digest of the CR value representing boot measurement of the current boot component concatenated with an existing CR value in a CR extend operation can be performed to generate an updated CR value in a CR (e.g., a PCR). The updated CR value stored in the CR can then be compared, locally or remotely, to known expected values at any respective stage of the boot-up operation to determine improper modifications in the boot components of the computing system.

In this regard, in exemplary aspects, to extend the measured boot process performed by the Trusted Platform Module (TPM) circuit to earlier, primitive boot components of the computing system that are processed before the TPM circuit becomes available to perform boot measurements, secure boot processing systems in each CPU are each configured to also measure its earlier, primitive boot components (e.g., loaded images, boot configurations, boot mode registers). Boot measurement values representing the measured primitive boot components are used to update a respective virtual CR value in a virtual CR for the respective CPU. A virtual CR digest is "virtual" in that it is updated outside of the TPM protected environment where the TPM CR(s) for the TPM circuit is located. In this manner, the final virtual CR value protects boot integrity of boot operations of its CPU even if they occur before availability of the TPM circuit. The final virtual CR value that has been updated as the primitive boot components are measured, is provided to the TPM circuit as an initial starting CR value for further boot measurements.

In the case of a multi-CPU computing system, each virtual CR value is updated for a respective as primitive boot components are accessed and measured. The virtual CR values for the multiple CPUs is merged together into a final merged virtual CR value. The final merged CR value is provided as the initial CR value to the TPM circuit to make subsequent boot component measurements.

In other exemplary aspects, the TPM circuit (or its TPM operations) is initialized (e.g., booted-up) to become available as a resource based on execution of a boot component by a CPU as part of its boot-up operation. For example, the TPM circuit (or its TPM operations) may be initialized (e.g., booted-up) to become available in response to a reset signal that is initiated or generated by a CPU.

In another exemplary aspect, the secure boot processing systems are configured to perform boot measurements of primitive boot components and update their respective virtual CR with such boot measurements based on executing a boot read-only-memory (ROM) program that is resident in a boot ROM and executed in response to the POR signal. The boot ROM program in this example is immutable in that it is stored in a boot ROM memory in the secure boot processing system. Execution of the boot ROM program may then include other executable images being loaded into the computing system that can be further executed as part of boot-up operations. These additional loaded images can also be configured to perform boot measurements of primitive boot components to update its respective virtual CR. In this manner, each boot stage of boot-up operations can include the capability of continuing to measure primitive boot components during the entire boot-up operation.

In this regard, in one exemplary, a multi-CPU computing system is provided. The multi-CPU system comprises a first CPU comprising a first configuration register (CR). The first CPU configured to, in response to a first reset signal indicating a boot-up state access one or more first boot components. For each accessed first boot component among the one or more first boot components, the first CPU is further configured to perform a first boot measurement on the accessed first boot component to generate a first CR value, and update a first existing CR value stored in the first CR based on the generated first CR value. The multi-CPU computing system also comprises a second CPU comprising a second CR register. The second CPU configured to, in response to a second reset signal indicating a boot-up state, access one or more second boot components. For each accessed second boot component among the one or more second boot components, the second CPU is further configured to perform a second boot measurement on the accessed second boot component to generate a second CR value, and update a second existing CR value stored in the second CR based on the generated second CR value. The first CPU further configured to merge the first existing CR value and the second existing CR value into a merged CR value, and communicate the merged CR value to a trust platform module (TPM) circuit to be used as an initial CR value to measure subsequent boot components.

In another exemplary aspect, a method of performing a secure boot process in a multi-CPU computing system is provided. The method comprises receiving a first reset signal. In response to a first reset signal indicating a boot-up state, the method also comprises a first CPU accessing one or more first boot components, and for each accessed first boot component among the one or more first boot components: performing a first boot measurement on the accessed first boot component to generate a first configuration register (CR) value, and updating a first existing CR value stored in a first CR based on the generated first CR value. The method also comprises receiving a second reset signal. In response to the second reset signal indicating a boot-up state, the method also comprises a second CPU: accessing one or more second boot components, and for each accessed second boot component among the one or more second boot components: performing a second boot measurement on the accessed second boot component to generate a second CR value, and updating a second existing CR value stored in a second CR based on the generated second CR value. The method also comprises merging the first existing CR value and the second existing CR value into a merged CR value, and communicating the merged CR value to a trust platform module (TPM) circuit to be used as an initial CR value to measure subsequent boot components.

In another exemplary aspect, a non-transitory computer-readable medium is provided. The non-transitory computer-readable medium has stored thereon computer executable instructions which, when executed by a processor, cause the processor to receive a first reset signal, and in response to a first reset signal indicating a boot-up state, access one or more first boot components, and for each accessed first boot component among the one or more first boot components: perform a first boot measurement on the accessed first boot component to generate a first configuration register (CR) value, and update a first existing CR value stored in a first CR based on the generated first CR value. The transitory computer-readable medium also has stored thereon computer executable instructions which, when executed by the processor, cause the processor to receive a second reset signal, in response to the second reset signal indicating a boot-up state: access one or more second boot component, and for each accessed second boot component among the one or more second boot components: perform a second boot measurement on the accessed second boot component to generate a second CR value, and update a second existing CR value stored in a second CR based on the generated second CR value. The transitory computer-readable medium also has stored thereon computer executable instructions which, when executed by a processor, cause the processor to merge the first existing CR value and the second existing CR value into a merged CR value, and communicate the merged CR value to a trust platform module (TPM) circuit to be used as an initial CR value to measure subsequent boot components In another exemplary aspect, a computing system is provided. The computing system comprises a CPU comprising a CR. The CPU is configured to, in response to a reset signal indicating a boot-up state: access one or more boot components, and for each accessed boot component among the one or more boot components: perform a boot measurement on the accessed boot component to generate a CR value, and update an existing CR value stored in the CR based on the generated CR value. The computing system also comprises a TPM circuit comprising a TPM CR. The TPM circuit is configured to, in response to a second reset signal indicating a boot-up state: receive the existing CR value, store the existing CR value as the initial TPM CR value in the TPM CR, and access one or more subsequent boot component. For each accessed subsequent boot component among the one or more subsequent boot components, the TPM circuit is further configured to perform a subsequent boot measurement on the accessed subsequent boot component to generate a TPM CR value, and update an existing TPM CR value stored in the TPM CR based on the generated TPM CR value.

In another exemplary aspect, a method of performing a secure boot process in a CPU computing system is provided. The method comprises receiving a reset signal. In response to the reset signal indicating a boot-up state, the method comprises accessing one or more boot components, and for each accessed boot component among the one or more boot components: performing a boot measurement on the accessed boot component to generate a configuration register (CR) value, and updating an existing CR value stored in a CR based on the generated CR value. In response to a second reset signal indicating a boot-up state, the method also comprises a TPM circuit receiving the existing CR value, storing the existing CR value as the initial TPM CR value in the TPM CR, and accessing one or more subsequent boot components. For each accessed subsequent boot component among the one or more subsequent boot components, the method also comprises the TPM circuit performing a subsequent boot measurement on the accessed subsequent boot component to generate a TPM CR value; and updating an existing TPM CR value stored in a TPM CR based on the generated TPM CR value.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
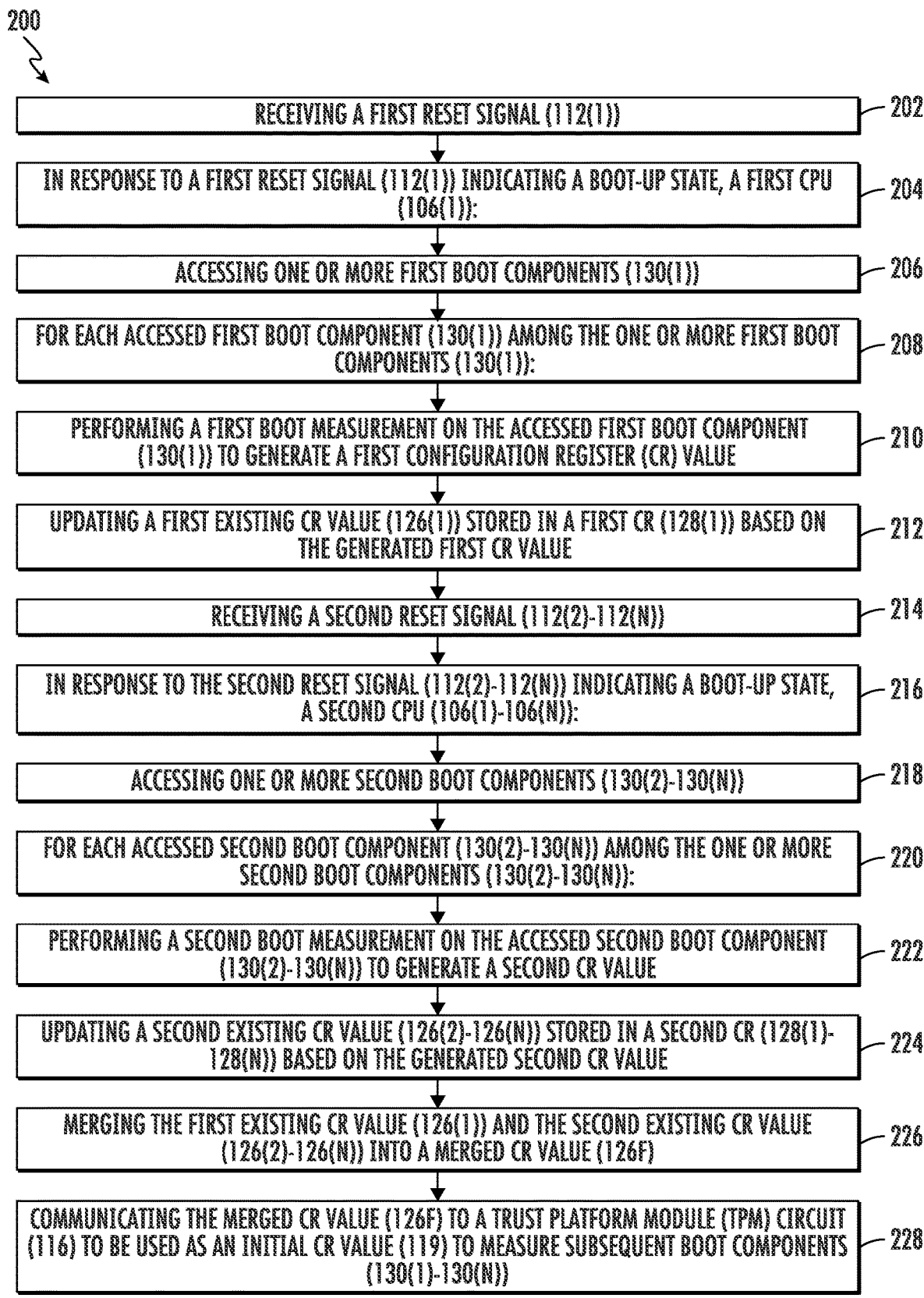
Figure 3:
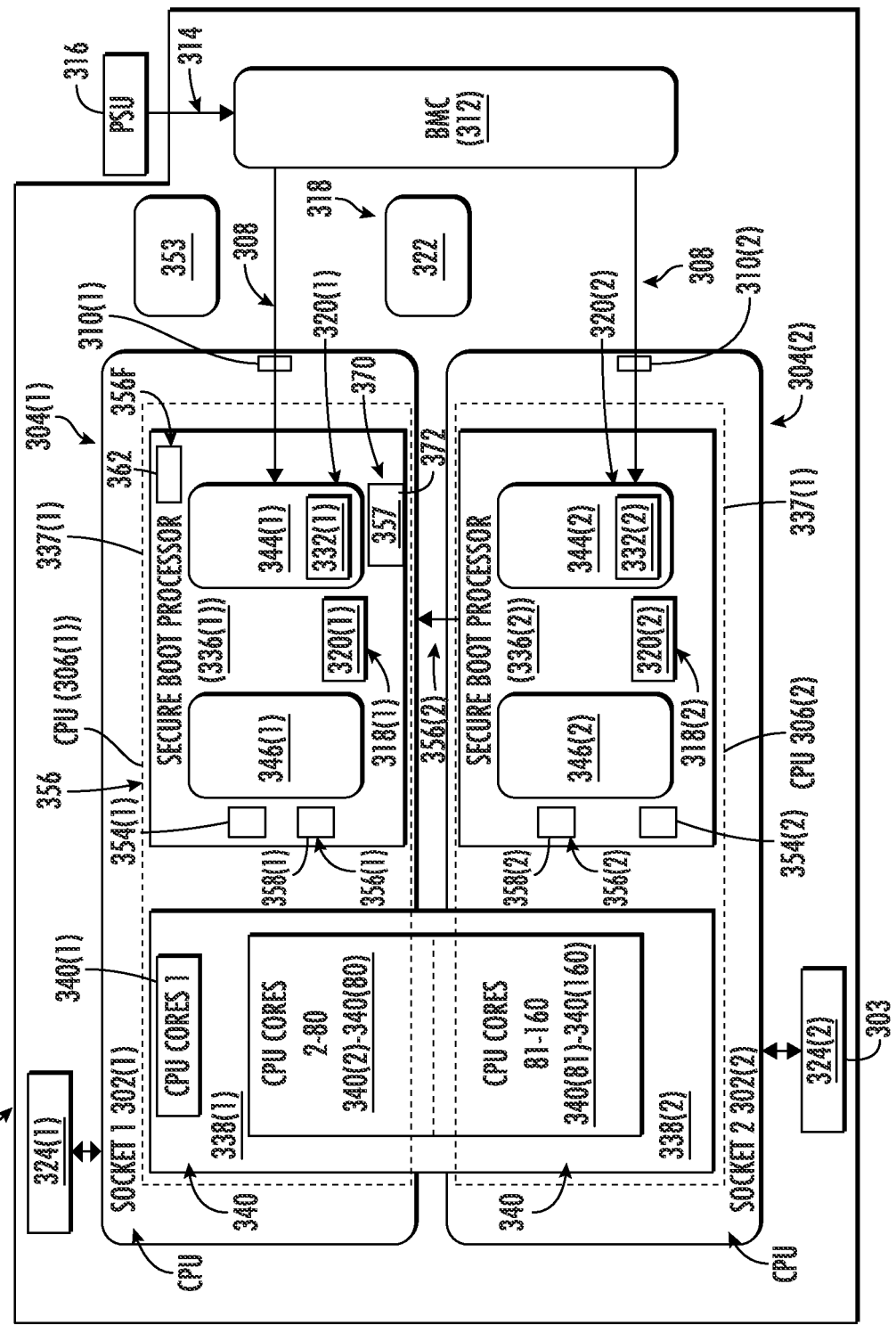
Figure 4:
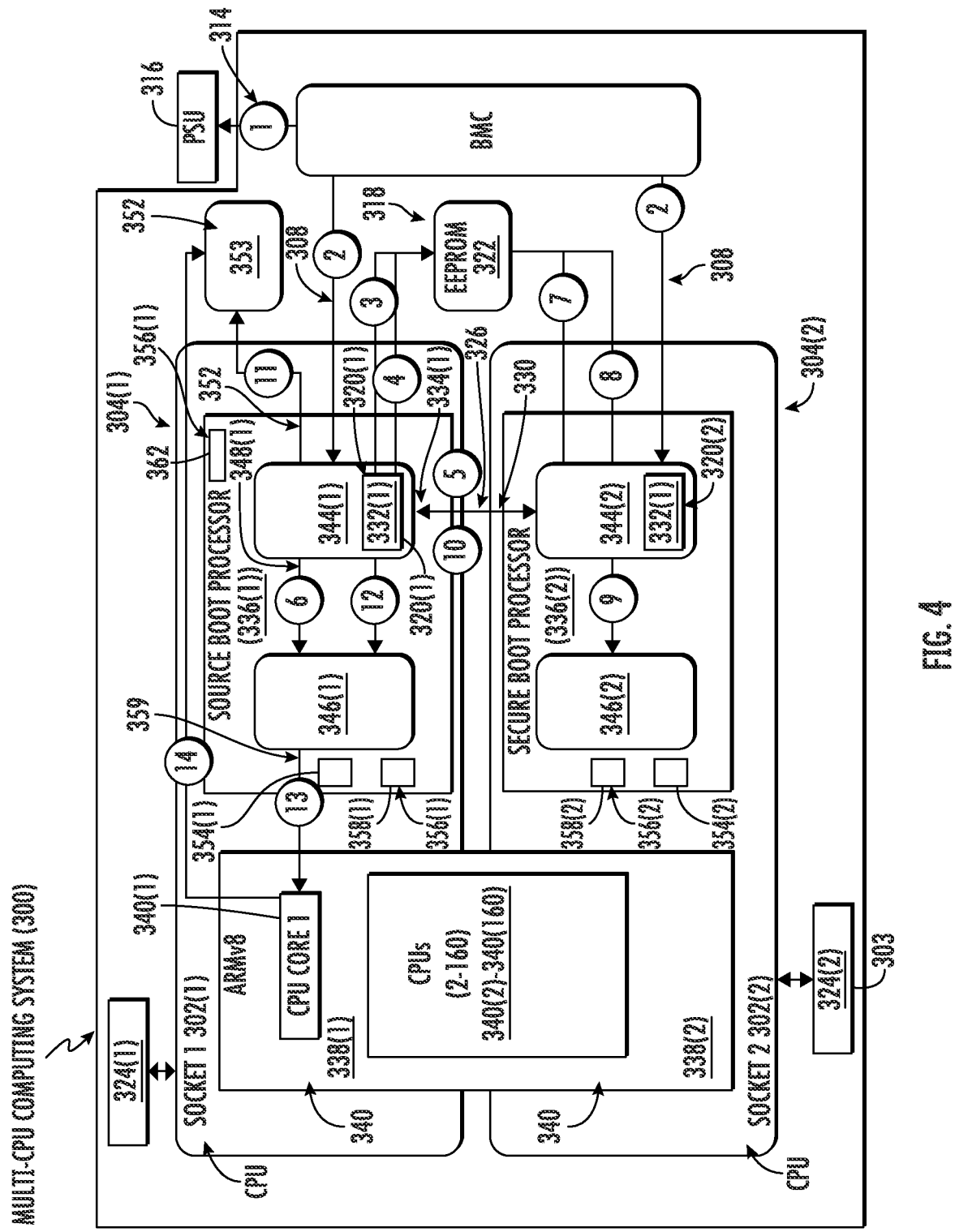
Figure 5:
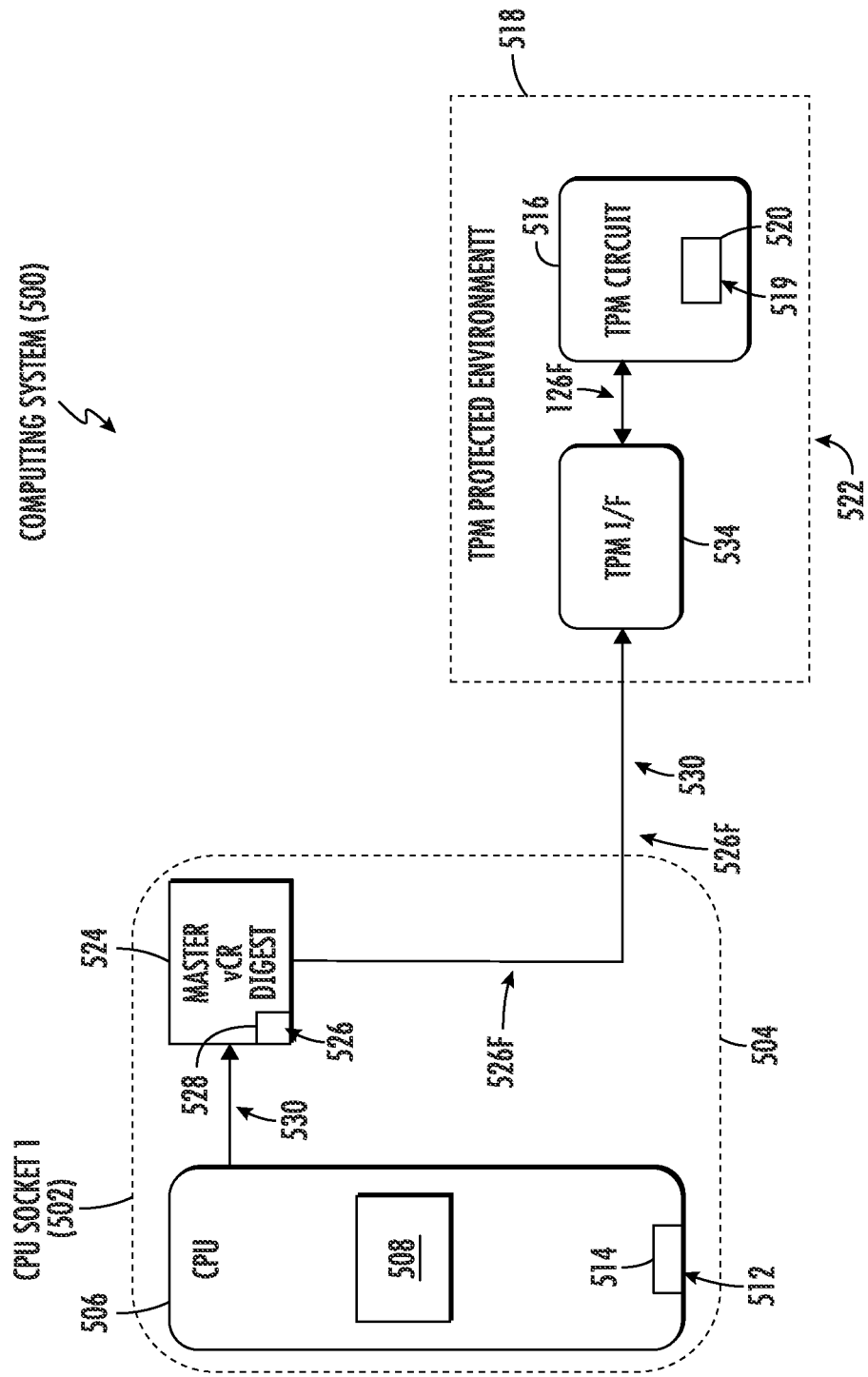
Figure 6:
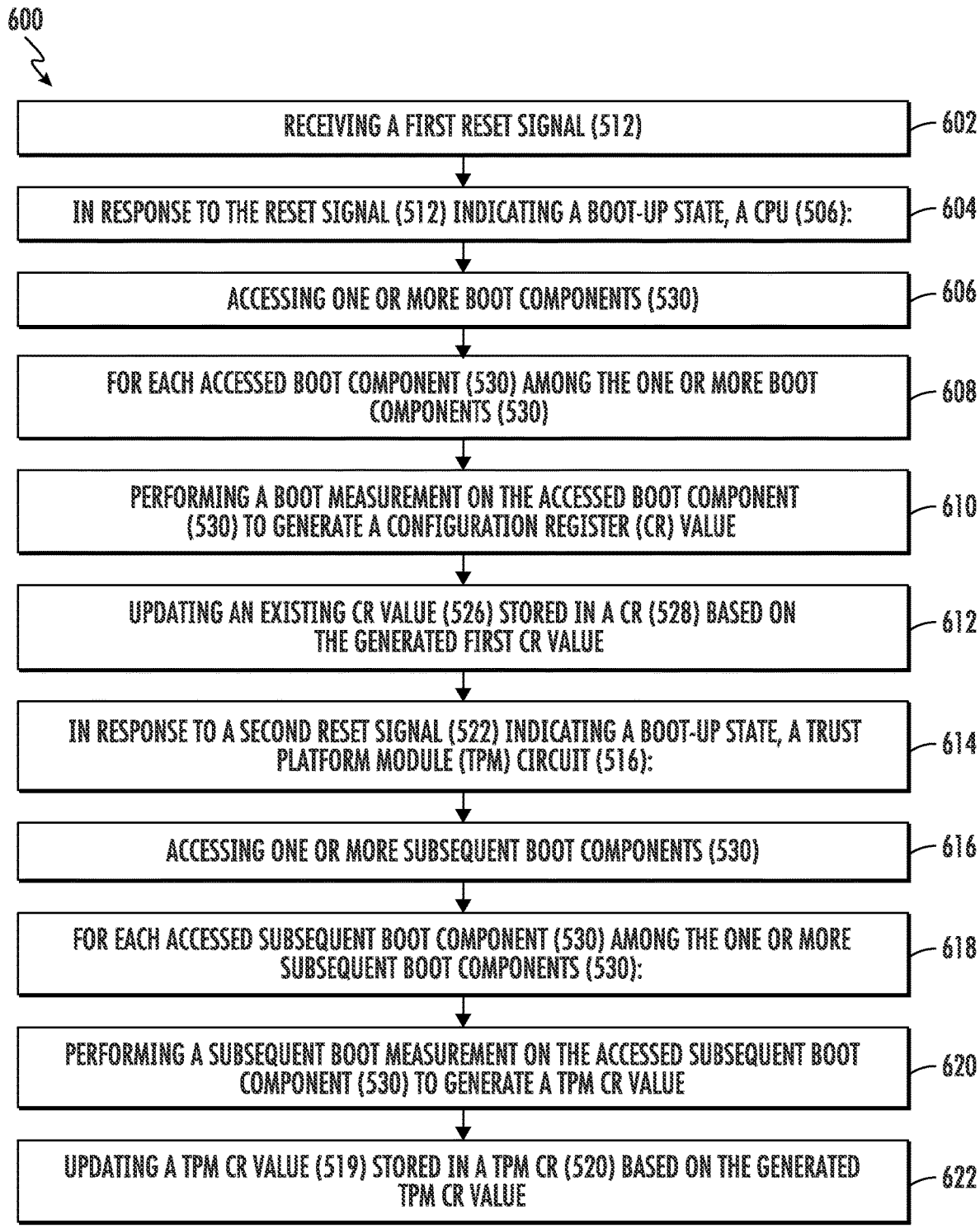
Figure 7:
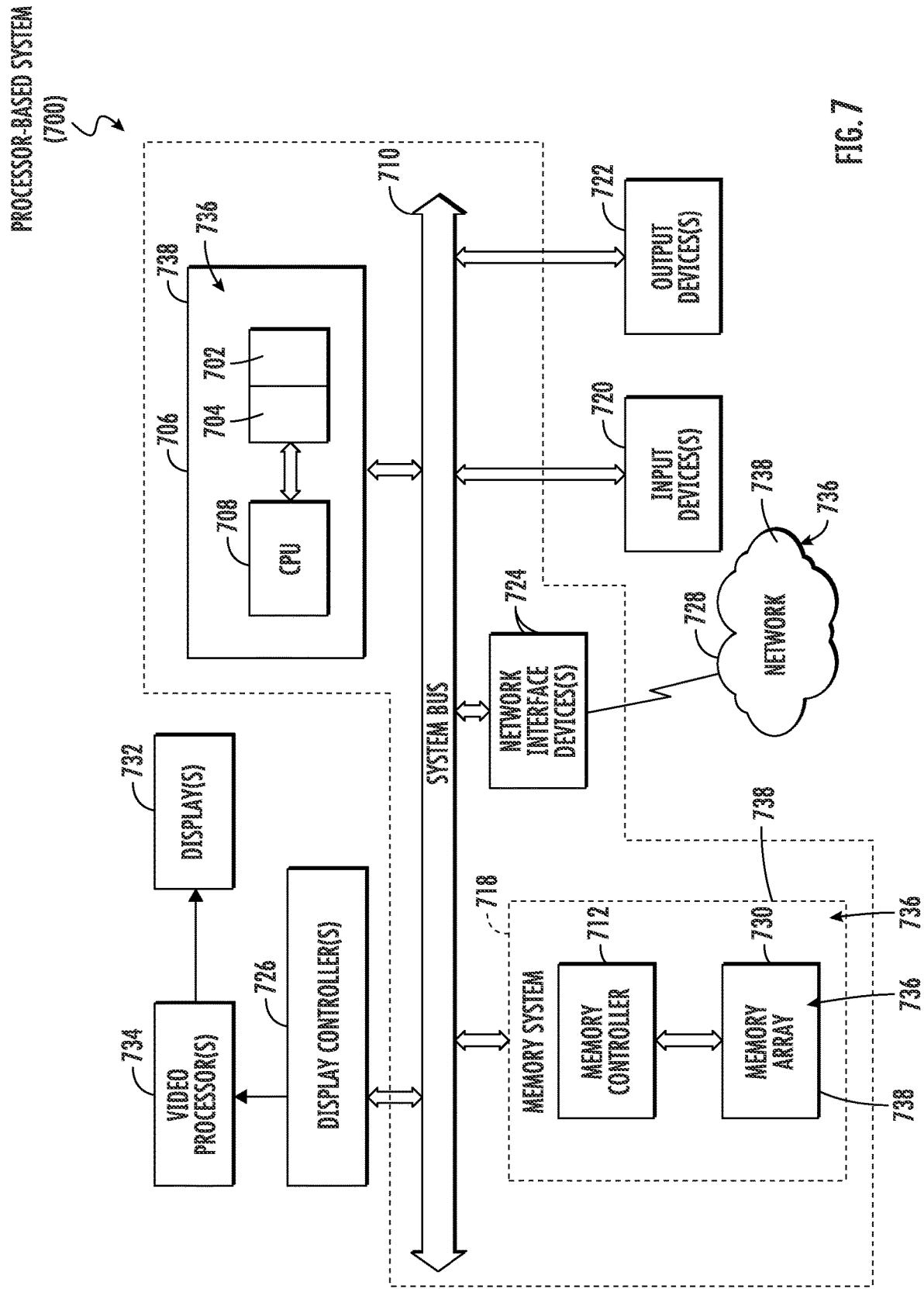

FIG. 1 is a block diagram of an exemplary multiple (multi-) central processing unit (CPU) computing system that includes respective CPUs that each include secure boot processing systems configured to measure earlier, primitive boot components for their respective CPUs and update respective virtual configuration register (CR) values that can merge into an initial CR value be used by the Trusted Platform Module (TPM) circuit, when available, to perform and record boot measurements of subsequent boot components to protect the integrity of boot-up operations;

FIG. 2 is a flowchart illustrating an exemplary primitive boot measurement process performed by a secure boot processing system in each CPU in the multi-CPU computing system in FIG. 1 to measure earlier, primitive boot components and update a virtual CR value that can be used by the TPM circuit as an initial CR value;

FIG. 3 is a block diagram of another exemplary multi-CPU computing system that includes respective CPUs that each include secure boot processing systems configured to measure earlier, primitive boot components for their respective CPUs and update respective virtual CR values that can merged into an initial CR value be used by the TPM circuit, when available, to perform and record boot measurements of subsequent boot components to protect the integrity of boot-up operations;

FIG. 4 is a block diagram of an exemplary boot-up operation process in the multi-CPU computing system in FIG. 3 measuring earlier, primitive boot components and updating respective virtual CR value that can merged into an initial CR value to be used by the TPM circuit for subsequent boot component measurements;

FIG. 5 is a block diagram of an exemplary single CPU computing system that includes a secure boot processing systems configured to measure earlier, primitive boot components and update a virtual CR value that can be provided as an initial CR value to be used by the TPM circuit, when available, to perform and record boot measurements of subsequent boot components to protect the integrity of boot-up operations;

FIG. 6 is a flowchart illustrating an exemplary primitive boot measurement process performed by a secure boot processing system in a CPU in the computing system in FIG. 5 to measure earlier, primitive boot components and update a virtual CR value that can be used by the TPM circuit as an initial CR value; and FIG. 7 is a block diagram of an exemplary processor-based system that includes a computing system that includes a secure boot processing system configured to measure earlier, primitive boot components and update a virtual CR value(s) that can be used by the TPM circuit as an initial CR value to perform and record boot measurements of subsequent boot components to protect the integrity of overall boot-up operation, including but not limited to the secure boot processing systems in FIGS. 1, 3, and 4.

DETAILED DESCRIPTION

Aspects disclosed herein include computing systems employing measurement of boot components, such as prior to trusted platform module (TPM) availability, for enhanced security. Related methods and computer-readable media are also disclosed. The computing system includes one or more central processing unit (CPUs) that each include one or more CPU cores. For example, the computing system may be a multi-socketed computing system that includes multiple CPU sockets each with a dedicated CPU. A CPU socket includes a secure boot processing system that can include one or more processors that perform boot-up operations in response to the computer system being powered on or reset (referred to as "power-on reset" (POR)) to provide a secured boot process. If the computing system is a multi-CPU computing system, a CPU of one CPU socket may be designated as a master CPU to coordinate boot-up operations. The computing system also includes a Trusted Platform Module (TPM) circuit (e.g., as a separate co-processor or firmware resource in a CPU) that, once initialized in boot-up operations and available as a resource, can provide boot measurements. The TPM circuit is configured to perform and record boot measurements of boot components in the computing system based on a digest (e.g., one-way hash) to generate an updated configuration register (CR) value as part of a measured boot process to enhance platform integrity. For example, a digest of the CR value representing boot measurement of the current boot component concatenated with an existing CR value in a CR extend operation can be performed to generate an updated CR value in a CR (e.g., a PCR). The updated CR value stored in the CR can then be compared, locally or remotely, to known expected values at any respective stage of the boot-up operation to determine improper modifications in the boot components of the computing system.

In this regard, in exemplary aspects, to extend the measured boot process performed by the TPM circuit to earlier, primitive boot components of the computing system that are processed before the TPM circuit becomes available to perform boot measurements, secure boot processing systems in each CPU are each configured to also measure its earlier, primitive boot components (e.g., loaded images, boot configurations, boot mode registers). Boot measurement values representing the measured primitive boot components are used to update a respective virtual CR value in a virtual CR for the respective CPU. A virtual CR is "virtual" in that it is updated outside of the TPM protected environment where TPM CR(s) for the TPM circuit is located. In this manner, the final virtual CR value protects boot integrity of boot operations of its CPU even if they occur before availability of the TPM circuit. The final virtual CR value that has been updated as the primitive boot components are measured, is provided to the TPM circuit as an initial starting CR value for further boot measurements.

In the case of a multi-CPU computing system, each virtual CR value is updated for a respective CPU as primitive boot components are accessed and measured for each CPU. The virtual CR values for the multiple CPUs are merged together into a final merged virtual CR value. The final merged CR value is provided as the initial CR value to the TPM circuit to make subsequent boot component measurements.

In this regard, FIG. 1 is a block diagram of the exemplary multiple (multi-) central processing unit (CPU) computing system 100 that includes 'N' number of central processing unit (CPU) chip sockets ("CPU sockets") 102(1)-102(N) (also labeled CPU SOCKET 1-CPU SOCKET N). The CPU sockets 102(1)-102(N) are each configured to support respective CPU chips 104(1)-104(N). Each CPU chip 104(1)-104(N) includes a respective CPU 106(1)-106(N) that includes a respective secure boot processing system 108(1)-108(N) configured to perform boot-up operations for their respective CPUs 106(1)-106(N). In this example, in a boot of the multi-CPU computing system 100, the first CPU 106(1) in the CPU socket 102(1) acts as a master CPU. The first CPU 106(1) is configured to receive a first reset signal 112(1) that is based on a power-on-reset (POR) signal on a respective master reset port 114(1) indicating a boot-up state, such as in response to a power cycle for example. In response to the first reset signal 112(1) indicating the boot-up state, the first CPU 106(1) acting as the master CPU is configured to perform a CPU boot-up operation in the first CPU 106(1). The other CPUs 106(2)-106(N) act as slave CPUs. In this regard, the other CPUs 106(1)-106(N) are configured to also perform a CPU boot-up operation in its respective CPU 106(2)-106(N). The secure boot processing systems 108(1)-108(N) in each CPU 106(1)-106(N) are configured to perform boot-up tasks based on boot components. For example, one boot component may be a boot read-only memory (ROM) program that is executed by a respective secure processor in the respective secure boot processing system 108(1)-108(N) to perform boot-up operations in response to the reset signal 112(1). Other boot components may include boot mode registers and other configurations that are used to perform boot-up operations. The secure boot processing systems 108(1)-108(N) can be designed to perform immutable boot-up tasks in a secure environment as part of a design to secure the boot-up operations of the multi-CPU computing system 100. The secure boot processing systems 108(2)-108(N) may be designed to start up boot-up operations based on a respective reset signal 112(2)-112(N) generated by the CPU 106(1) as a master CPU in response to receiving the reset signal 112(1) based on a synchronization scheme.

With continuing reference to FIG. 1, the multi-CPU computing system 100 also includes a TPM circuit 116 as part of a TPM protected environment 118. In this example, the TPM circuit 116 is a separate integrated circuit (IC) chip that is provided as a separate co-processor to the CPUs 106(1)-106(N). The TPM circuit 116 is configured to perform boot measurements of boot components and/or other measurements as an extra layer of security that is complementary to a secure boot process performed by the secure boot processing systems 108(1)-108(N) in the respective CPUs 106(1)-106(N). A secure boot relies on local attestation and authentication of the firmware binaries loaded into the multi-CPU computing system 100 in a boot-up operation and executed to continue to perform boot-up tasks in a boot-up operation. However, a measured boot performs remote or local attestation (i.e., measurement) of the platform integrity of the multi-CPU computing system 100. Examples of validation of platform integrity include validating boot flow (i.e., order of image load and boot related events), validation of boot configuration, validation of platform configuration (e.g., interfaces), and validation of platform devices (e.g., read-only memories (ROMs)). These boot integrity measurements are updated in a TPM configuration register (CR) 120 that can be used to determine intrusions. If a TPM CR value 119 stored in the TPM CR 120 does not match an expected value at each stage of the boot-up process in the CPU 106(1)-106(N), this means one or more boot components of the CPU 106(1)-106(N) may have been compromised.

To update the TPM CR 120 in a boot-up operation, the TPM circuit 116 is requested by a CPU 106(1)-106(N) to perform a boot measurement on a new (next) boot component to be measured as part of boot-up operations performed by their respective secure boot processing systems 108(1)-108(N). The TPM circuit 116 performs a boot measurement of a boot component in one example by taking a digest (e.g., a one-way hash using an algorithm such as SHA-1) of the boot component using a hash algorithm to create a current CR value for the measured boot component. The current CR value is then used to update the existing TPM CR value 119 stored in the TPM CR 120. In this regard, in an example, a digest is taken of the current CR value for the boot component concatenated with the existing TPM CR value 119 in the respective TPM CR 120 in a CR extend operation to create a new CR value that is stored overtop the prior, existing TPM CR value 119 in the TPM CR 120. For example, the TPM CR 120 may be a platform configuration register (PCR) according to the TPM standard ISO/IEC 11889 based on various specifications defined by the Trusted Computing Group (TCG). As an example, the digest may be based on the SHA-1 hash algorithm to produce a 20-bit PCR value. By using a boot measurement of a current boot component to generate a CR value that is used to update an existing TPM CR value 119 stored in the TPM CR 120, an infinite number of boot measurements can be represented in a single CR value stored in a TPM CR 120 for a CPUs 106(1)-106(N) with no boot measurements having to be discarded to make room for newer boot measurements. The TPM CR value 119 stored in the TPM CR 120 can be compared, locally or remotely, to known expected values at any respective stage of the boot-up operation to determine improper modifications in the boot components of the CPUs 106(1)-106(N).

However, the TPM circuit 116 that can be used perform boot measurement for boot components of the respective secure boot processing systems 108(1)-108(N) in the respective CPUs 106(1)-106(N) for attestation of platform integrity may not be available as a resource during initial stages of a boot-up operation in the CPUs 106(1)-106(N). The TPM circuit 116 has to be brought up in a TPM protected environment 118 as part of a boot-up operation after initial stages and configuration boot-up tasks are performed by the CPU 106(1) acting as a master CPU 106(1) in this example that are necessary in order for the TPM circuit 116 to be available and ready to perform boot measurements. For example, the CPU 106(1) acting as a master CPU can generate a reset signal 122 to cause the TPM circuit 116 to be initialized and booted as part of a boot-up operation to be made available to perform boot measurements. This allows the TPM circuit 116 to be available and ready to perform boot measurements when requested by the CPUs 106(1)-106(N) to measure the platform integrity of the secure boot processing systems 108(1)-108(N) of the respective CPUs 106(1)-106(N). However, the boot-up process performed by the secure boot processing system 108(1) in the CPU 106(1) may need to perform earlier, more primitive boot-up tasks and operations before a boot-up task can be performed that generates the reset signal 122 to boot-up the TPM circuit 116 to be available for boot measurement. For example, the secure boot processing system 108(1) in the CPU 106(1) may need to first execute an immutable ROM program to perform certain earlier, more primitive boot-up tasks as well as performing a boot-up task to loader in a bootloader program to be executed to continue performing higher level boot-up tasks.

In this regard, in the multi-CPU computing system 100 in FIG. 1, the measured boot process performed by the TPM circuit 116 is extended to earlier, primitive boot components of the secure boot processing systems 108(1)-108(N) in the CPUs 106(1)-106(N) that are performed before the TPM circuit 116 becomes available to perform boot measurements. The secure boot processing systems 108(1)-108(N) in each CPU 106(1)-106(N) are each configured to measure their respective earlier, primitive boot components (e.g., loaded images, boot configurations, boot mode registers) independent of the TPM circuit 116. The secure boot processing systems 108(1)-108(N) are configured to execute program code (e.g., an immutable boot ROM program) to perform a boot measurement based on the boot measurement scheme employed by the TPM circuit 116 and described above. In this regard, each CPU 106(1)-106(N) includes a virtual CR (vCR) digest 124(1)-124(N) that is configured to generate a vCR value 126(1)-126(N) stored in a respective vCR 128(1)-128(N) for a boot component 130(1)-130(N) provided by the respective CPU 106(1)-106(N). The vCR values 126(1)-126(N) are initially set to zero in this example before boot measurements are used to update the vCR values 126(1)-126(N). The vCRs 128(1)-128(N) are physical registers in the respective vCR digest 124(1)-124(N), but are "virtual" in that they updated outside of the TPM protected environment 118 where the TPM CR 120 for the TPM circuit 116 is located.

With continuing reference to FIG. 1, the respective vCR digests 124(1)-124(N) are called up by the secure boot processing systems 108(1)-108(N) of the CPUs 106(1)-106(N) to perform a boot measurement of the boot component 130(1)-130(N) as part of its boot-up operation. The vCR digests 124(1)-124(N) take a digest of the boot component 130(1)-130(N) using a bashing algorithm (e.g., SHA-1) to generate a current CR value for the measured boot component. The current CR value is used to update the existing vCR value 126(1)-126(N) stored in a respective vCR 128(1)-128(N). In this regard, a digest is also taken of the current CR value generated for the boot component concatenated with the existing vCR value 126(1)-126(N) stored in the respective vCR 128(1)-128(N) in a CR extend operation to create a new vCR value 126(1)-126(N) that is stored overtop the prior, existing vCR value 126(1)-126(N)

in the respective vCR 128(1)-128(N). For example, the vCRs 128(1)-128(N) may be PCRs according to the TPM standard ISO/IEC 11889 based on various specifications defined by the Trusted Computing Group (TCG). The digest taken may be based on the SHA-1 algorithm to produce a 20-bit PCR value. By using a boot measurement of a current boot component to generate a CR value that is used to update the existing vCR value 126(1)-126(N) stored in the respective vCRs 128(1)-128(N), an infinite number of boot measurements can be represented in a single vCR value 126(1)-126(N) stored in a respective vCR 128(1)-128(N) for a respective CPU 106(1)-106(N) with no boot measurements having to be discarded to make room for newer boot measurements.

Once the TPM circuit 116 is initialized and available for use, the TPM circuit 116 can perform boot measurements to update the TPM CR value 119 in the TPM CR 120 as discussed above. In the example multi-CPU computing system 100 in FIG. 1, it is desired to preserve the integrity of the secure boot processing systems 108(1)-108(N) and their boot-up operations end-to-end. What this means is that it is desired to perform and update a respective CR value for the respective CPUs 106(1)-106(N) based on boot measurements on both the earlier, primitive boot components encountered before the TPM circuit 116 is available as well as perform and update a respective CR value based on boot measurements for boot components encountered after the TPM circuit 116 is available. In this manner, as shown in FIG. 1 in this example, the CPU 106(1) acting as a master CPU includes a vCR value merge circuit 132 configured to receive and merge the individual vCR values 126(1)-126(N) in the respective vCR digests 124(1)-124(N) into a final vCR value 126F that is communicated to a final vCR digest 124F. The final vCR value 126 represents the collective boot measurements of the boot components in the respective secure boot processing systems 108(1)-108(N) in the respective CPUs 106(1)-106(N). The final merged vCR value 126F is provided by the vCR digest 124F to the TPM circuit 116 through a TPM circuit interface 134. The TPM circuit 116 can use the final merged vCR value 126F as the initial TPM CR value 119, as opposed to an initial zero CR value for example. The TPM circuit 116 can then continue to update the TPM CR 120 with the TPM CR value 119 based on the measured boot components from the secure boot processing systems 108(1)-108(N), which can then be authenticated locally or remotely.

In this manner, the circuits and operations of the TPM circuit 116 to update CR values based on boot measurements include boot measurement information from the earlier, primitive boot components performed by the secure boot processing systems 108(1)-108(N), including before the TPM circuit 116 was available. This allows the TPM circuit 116 to preserve the integrity of the boot-up operation of the multi-CPU computing system 100 without there being a gap in security between the occurrence of the reset signal 112(1) and when the TPM circuit 116 becomes available to perform boot measurements of boot components.

FIG. 2 is a flowchart illustrating an exemplary primitive boot measurement process 200 performed in the secure boot processing systems 108(1)-108(N) of the respective CPUs 106(1)-106(N) in FIG. 1. The primitive boot measurement process 200 virtually measures earlier, primitive boot components and updates a vCR value 126 that can be used by the TPM circuit 116 as the initial TPM CR value 119. In this regard, with reference to FIG. 2, a first step in the process is the first CPU 106(1) receiving a first reset signal 112(1) (block 202 in FIG. 2). In response to receiving a first reset signal 112(1) (block 204 in FIG. 2), a next step in the primitive boot measurement process 200 is the CPU 106(1), acting as a master CPU, accessing one or more first boot components 130(1) (block 206 in FIG. 2). For each accessed first boot component 130(1) among the one or more first boot components 130(1) (block 208 in FIG. 2), the first CPU 106(1) (e.g., using the vCR digest 124(1)) performs a first boot measurement on the accessed first boot component 130(1) to generate a first CR value (e.g., a vCR value) (block 210 in FIG. 2). The primitive boot measurement process 200 also includes the first CPU 106(1) updating a first existing CR value 126(1) stored in a first CR 128(1) based on the generated first CR value (block 212 in FIG. 2).

With continuing reference to FIG. 2, a next step in the exemplary primitive boot measurement process 200 is a second CPU 106(2)-106(N) receiving a second reset signal 112(2)-112(N) (block 214 in FIG. 2). In response to the second reset signal 112(2)-112(N) indicating a boot-up state (block 216 in FIG. 2), the second CPU 106(1)-106(N) accesses one or more second boot components 130(2)-130(N) (block 218 in FIG. 2). For each accessed second boot component 130(2)-130(N) among the one or more second boot components 130(2)-130(N) (block 220 in FIG. 2), the second CPU 106(1)-106(N) (e.g., using the vCR digest 124(1)-124(N)) performs a second boot measurement on the accessed second boot component 130(2)-130(N) to generate a second CR value (block 222 in FIG. 2). The second CPU 106(1)-106(N) updates a second existing CR value 126(2)-126(N) stored in a second CR 128(1)-128(N) based on the generated second CR value (block 224 in FIG. 2). The first CPU 106(1), using the merge circuit 132, merges the first existing CR value 126(1) and the second existing CR value 126(2)-126(N) into a final merged CR value 126F (block 226 in FIG. 2). The first CPU 106(1) then communicating the final merged CR value 126F to the TPM circuit 116 to be used as an initial TPM CR value 119 to continue with boot measurements for the multi-CPU computing system 100 (block 228 in FIG. 2).

FIG. 3 is a block diagram of another exemplary multi-CPU computing system 300 that is configured to measure earlier, primitive boot components and update respective vCR values that can be merged into an initial CR value to be used by a TPM circuit, when available. In the multi-CPU computing system 300, secure boot processors 336(1), 336(2) separate from CPU cores 340 of CPUs 306(1), 306(2) are employed to perform boot-up operations for their respective CPUs 306(1), 306(2). The secure boot processors 336(1), 336(2) are provided as part of secure boot processing systems 337(1), 337(2) to provide certain immutable boot operations that are protected from access through the CPUs 306(1), 306(2) by external agents in an unauthorized manner. The multi-CPU computing system 300 also includes a TPM circuit 357 that can perform and record boot measurements of subsequent boot components using the initial CR value generated by merged respective CR values generated by the respective secure boot processors 336(1), 336(2) to protect the integrity of boot-up operations for the multi-CPU computing system 300.

In this regard, the multi-CPU computing system 300 includes two (2) central processing unit (CPU) chip sockets ("CPU sockets") 302(1), 302(2) (also labeled CPU SOCKET 1 and CPU SOCKET 2) that are mounted on a circuit board 303. The CPU sockets 302(1), 302(1) are each configured to support respective CPU chips 304(1), 304(2). Each CPU chip 304(1), 304(2) includes a respective CPU 306(1), 306(2) configured to perform certain boot-up operations in response to a boot of the multi-CPU computing system 300. Note that only two (2) CPU sockets 302(1), 302(2) supporting two CPUs 306(1), 306(2) are shown, but more than two CPU sockets 302 supporting more than two (2) CPU could also be provided. The CPU 306(1) acts as a master CPU, and the CPU 306(2) acts as a slave CPU. The master CPU 306(1) includes a secure boot processor 336(1) as part of a secure boot processing system 337(1) and an application processor 338(1). The slave CPU 306(2) includes a secure boot processor 336(2) as part of a secure boot processing system 337(2) and an application processor 338(2). As will be discussed in more detail below, the secure boot processors 336(1), 336(2) are responsible for performing lower-level, hardware boot-up operations involving boot components by executing boot program code 318 loaded from a memory 322 (e.g., an EEPROM) in response to a reset or power cycle of the multi-CPU computing system 300. These are referred to as "hardware" boot-up operations, examples of which are described in more detail below.

As will also be discussed in more detail below, the application processors 338(1), 338(2) include respective CPU cores 340 that are configured to execute program code to execute higher lever applications for the multi-CPU computing system 300. In this example, the application processor 338(1) of the master CPU 306(1) includes eighty (80) CPU cores 340(1)-340(80). The application processor 338(2) of the slave CPU 306(2) includes eighty (80) CPU cores 340(81)-340(160). The application processors 338(1), 338(2) can invoke a designated number of their respective CPU cores 340(1)-340(79), 340(80)-340(160) to perform application boot-up operations for the multi-CPU computing system 300. This is because the boot-up process for multi-CPU computing system 300 may include boot-up tasks that are suited in particular to be performed by the application processors 338(1), 338(2) and not the secure boot processors 336(1), 336(2). However, the secure boot processors 336(1), 336(2) perform hardware boot-up operations first to initialize certain resources that may be necessary to be booted in order for the application processors 338(1), 338(2) to then perform application boot-up and then application processes. For example, one of the hardware boot-up operations may be to boot-up and initialize system memory that can then be used by the application processors 338(1), 338(2). As another example, another of the hardware boot-up tasks performed by the secure boot processor 336(1) in the master CPU 306(1) may be to load basic input/output software (BIOS) into a CPU core, such as CPU core 340(1), to then load in an operating system to be executed to service execution of the other CPU cores 340(1)-340(159) across both CPUs 306(1), 306(2). System memory 324(1), 324(2) is coupled to the respective CPU sockets 302(1), 302(2) that can be provided as a shared computing resource (e.g., double data rate (DDR) random access memory (RAM)) that can serve as part of an overall memory for the multi-CPU computing system 300.

With continuing reference to FIG. 3, the secure boot processors 336(1), 336(2) in the respective master and slave CPUs 306(1), 306(2) include multiple components that share responsibility to perform certain hardware boot-up operations in this example. In this example, the secure boot processors 336(1), 336(2) include respective security and management controllers 344(1), 344(2) that are configured to perform hardware boot-up tasks upon coming out of a reset as indicated by the master reset signal 308 indicating a boot-up state. The BMC 312 is configured to receive a power signal 314 from a power supply unit (PSU) 316 indicating a reset or power cycle of the multi-CPU computing system 300. The BMC 312 is configured to generate the master reset signal 308 to the reset ports 310(1), 310(2) of the CPUs 306(1), 306(2) in the respective CPU sockets 302(1), 302(2), indicating a boot-up state. The secure boot processors 336(1), 336(2) also include respective power management controllers 346(1), 346(2) that are configured to perform power management initialization boot-up operations in the hardware boot-up process after the security and management controllers 344(1), 344(2) perform initial hardware boot-up tasks. The security and management controllers 344(1), 344(2) and power management controllers 346(1), 346(2) may be micro-controllers. Providing the separate security and management controllers 344(1), 344(2) and power management controllers 346(1), 346(2) in the respective secure boot processors 336(1), 336(2) allows the master CPU 306(1) and the slave CPU 306(2) to perform hardware boot-up operations in parallel and partially concurrent with each other and in turn initiate application boot-up operations to be performed in their respective application processors 338(1), 338(2).

With continuing reference to FIG. 3, the multi-CPU computing system 300 also includes a TPM circuit 357. In this example, the TPM circuit 357 is provided as TPM firmware in the secure boot processing system 337(1) that can be executed by the secure boot processor 336(1). The TPM circuit 357 is configured to perform boot measurements of boot components and/or other measurements as an extra layer of security that is complementary to a secure boot process performed by the secure boot processors 336(1), 336(2) in the respective secure boot processing systems 337(1), 337(2). The TPM circuit 357 can operate like the TPM circuit 116 described above in FIG. 1. The measured boot process performed by the TPM circuit 357 is extended to earlier, primitive boot components of the secure boot processing systems 337(1), 337(2) that are performed before the TPM circuit 357 becomes available to perform boot measurements. The secure boot processing systems 337(1), 337(2) are each configured to measure their respective earlier, primitive boot components (e.g., loaded images, boot configurations, boot mode registers) independent of the TPM circuit 357. The secure boot processors 336(1), 336(2) are configured to execute boot ROM program 332(1), 332(2) in an immutable boot ROM 320(1), 320(2) to perform boot-up tasks and to perform a boot measurement based on the boot measurement scheme employed by the TPM circuit 357 and described above. In this regard, each secure boot processing system 337(1), 337(2) includes a virtual CR (vCR) digest 354(1), 354(2) that is configured to generate a vCR value 356(1), 356(N) stored in a respective vCR 358(1), 358(2) for a boot component in the secure boot processing system 337(1), 337(2). The vCRs 358(1), 358(N) being included in the secure boot processing systems 337(1), 337(2) are private registers that are inaccessible by the CPU cores 340(1)-340(160). The vCR values 356(1), 356(N) are initially set to zero in this example before boot measurements are used to update the vCR values 356(1), 356(N). The vCRs 358(1), 358(N) are physical registers in the respective vCR digest 354(1), 354(N), but are "virtual" in that they are updated outside of the TPM protected environment 118 where a TPM CR 370 for the TPM circuit 116 is located.

With continuing reference to FIG. 3, the respective vCR digest 354(1), 354(N) are called up by the secure boot processor 336(1), 336(2) to perform a boot measurement of a boot component 130(1)-130(N) as part of its boot-up operation. The vCR digests 354(1), 354(2) take a digest of the boot component using a hashing algorithm (e.g., SHA-1) to generate a current CR value for the measured boot component. The current CR value is used to update the existing vCR value 356(1), 356(2) stored in a respective vCR 358(1), 358(N). In this regard, a digest is also taken of the current CR value generated for the boot component concatenated with the existing vCR value 356(1), 356(N) stored in the respective vCR 358(1), 358(N) in a CR extend operation to create a new vCR value 356(1), 356(N) that is stored overtop the prior, existing vCR value 356(1), 356(2) in the respective vCR 358(1), 358(2). For example, the vCRs 358(1), 358(N) may be PCRs according to the TPM Standard ISO/IEC 11889 based on various specifications defined by the Trusted Computing Group (TCG). The digest taken may be based on the SHA-1 algorithm to produce a 20-bit PCR value. By using a boot measurement of a current boot component to generate a CR value that is used to update the existing vCR value 356(1), 356(N) stored in the respective vCRs 358(1), 358(N), an infinite number of boot measurements can be represented in a single vCR value 356(1), 356(N) stored in a respective vCR 358(1), 358(N) for a respective secure boot processing system 337(1), 337(2) with no boot measurements having to be discarded to make room for newer boot measurements.

Once the TPM circuit 357 is initialized and available for use, the TPM circuit 357 can perform boot measurements to update the TPM CR value 370 in the TPM CR 372 like discussed above for the TPM circuit 116 in FIG. 1. In the example multi-CPU computing system 300 in FIG. 3, it is desired to preserve the integrity of the secure boot processing systems 337(1)-337(N) and their boot-up operations end-to-end. What this means is that it is desired to perform and update a respective CR value for the respective secure boot processing systems 337(1)-337(N) based on boot measurement on both the earlier, primitive boot components encountered before the TPM circuit 357 is available as well as perform and update a respective CR value based on boot measurements for boot components encountered after the TPM circuit 357 is available. In this manner, as shown in FIG. 3 in this example, secure boot processor 336(1), acting as a master boot processor, includes a vCR value merge circuit 362 configured to receive and merge the individual vCR values 356(1), 356(2) in the respective vCR digests 354(1), 354(N) into a final vCR value 356F. The final vCR value 356F represents the collective boot measurements of the boot components in the respective secure boot processing systems 337(1), 337(2). The final vCR value 356F is provided to the TPM circuit 357. The TPM circuit 357 can use the final vCR value 356F as the initial TPM CR value 370, as opposed to an initial zero CR value for example. The TPM circuit 357 can then continue to update the TPM CR 372 with the TPM CR value 370 based on the measured boot components from the secure boot processing systems 337(1), 337(2), which can then be authenticated locally or remotely.

In this manner, the circuits and operations of the TPM circuit 357 to update CR values based on boot measurements include boot measurement information from the earlier, primitive boot components performed by the secure boot processing systems 337(1), 337(2), including before the TPM circuit 357 was available. This allows the TPM circuit 357 to preserve the integrity of the boot-up operation of the multi-CPU computing system 300 without there being a gap in security between the occurrence of the reset signal 308 and when the TPM circuit 357 becomes available to perform boot measurements of boot components.

To illustrate an exemplary boot-up operation process flow in the multi-CPU computing system 300 in FIG. 3, FIG. 4 is provided. FIG. 4 is a block diagram that illustrates an exemplary boot-up operation process flow for the multi-CPU computing system 300 in FIG. 3. The discussion of processes for the exemplary boot-up operation process in the multi-CPU computing system 300 are shown in numbered circles 1-15 in FIG. 4, which are referenced below.

In this regard, as illustrated in FIG. 4, the BMC 312 is configured to receive a power signal 314 from a PSU 316 indicating a reset or power cycle of the multi-CPU computing system 300 (number 1). In response, the BMC 312 is configured to generate the master reset signal 308 to the reset ports 310(1), 310(2) of the CPUs 306(1), 306(2) in the respective CPU sockets 302(1), 302(2) indicating a boot-up state (number 2). The security and management controller 344(1) of the boot processor 336(1) of the CPU 306(1) receives the master reset signal 308. In response, the security and management controller 344(1) is configured to execute a low-level immutable boot ROM program 332(1) that may be stored in boot ROM 320(1). The CPUs 306(1), 306(2) are configured to execute their immutable boot ROM program 332(1), 332(2) in a boot of the multi-CPU computing system 300 upon receipt of the master reset signal 308 indicating the boot-up state. The security and management controller 344(1) starts execution of the immutable boot ROM program 332(1) starting at its reset vector in response to the master reset signal 308. The boot ROM program 332(1) executes boot-up tasks of which the vCR digest 354(1) can be called upon to perform boot measurements to boot components encountered as part of boot-up operations to update the vCR value 356(1) in the vCR 358(1) as discussed above. The security and management processor's 344(1) execution of the immutable boot ROM program 332(1) cause the bootloader program 318 to be loaded from memory 322 for the CPU 306(1) (numbers 3 and 4). The bootloader program 318(1) may include boot program code for the security and management controller 344(1) and the power management controller 346(1). The loading in of the bootloader program 318(1) is a boot component that can be measured by a boot measurement.

The security and management controller 344(2) of the boot processor 336(2) of the slave CPU 306(2) receives the master reset signal 308 contemporaneously with the master CPU's 306(1) receipt. This causes slave CPU 306(2) to execute its boot ROM program 332(2) to initiate the hardware boot-up operations in the CPU 306(2). The boot ROM program 332(2) executes boot-up tasks of which the vCR digest 354(2) can be called upon to perform boot measurements to boot components encountered as part of boot-up operations to update the vCR value 356(2) in the vCR 358(2) as discussed above. The security and management processor's 344(2) execution of the boot ROM program 332(2) causes the bootloader program 318(2) to be loaded from memory 322 for the CPU 306(2). The bootloader program 318(2) may include boot program code for the security and management controller 344(2) and the power management controller 346(2). However, in this example, execution of the boot ROM program 332(2) causes the slave CPU 306(2) to wait until a slave boot-up synchronization signal 330 from the master CPU 306(1) is received indicating the boot-up state (number 5). In parallel, the security and management controller 344(1) of the boot processor 336(1) of the master CPU 306(1) issues a release reset signal 348(1) to the power management controller 346(1) to continue performing hardware boot-up tasks including a power management boot-up tasks for the CPU 306(1) (number 6).

Concurrently, in response to receipt of the slave boot-up synchronization signal 330, the security and management controller 344(2) of the boot processor 336(2) of the slave CPU 306(2) loads in its respective bootloader program 318(2) from the memory 322 in a serialized manner (numbers 7 and 8). The security and management controller 344(2) waits to load the bootloader program 318(2) from the memory 322 until the slave boot-up synchronization signal 330 is received, which avoids contention between the master and slave CPUs 306(1), 306(2) trying to load the bootloader program 318 from memory 322 at the same time. The loading in of the bootloader program 318(2) is a boot component that can be requested to be measured to update the respective vCRs 358(1), 358(2). One of the advantages of the sideband communication channel 326 is that it enables coordination by the CPUs 306(1), 306(2) of shared resources, such external memory 322, so that the CPUs 306(1), 306(2) are not accessing the shared resource in a contentious manner. The slave boot-up synchronization signal 330 acts a release indicator to release the slave CPU 306(2) to continue performing its hardware boot-up operation. But by the master CPU 306(1) communicating the slave boot-up synchronization signal 330 to the slave CPU 306(2) as part of its hardware boot-up operation, this frees the slave CPU 306(2) to then load in its respective bootloader program 318(2) from the memory 322 into its local boot ROM 320(2) to then also execute its hardware boot-up operation partially concurrently with the master CPU's 306(1) performance of its hardware boot-up operation. The bootloader program 318(2) may include boot program code for the security and management controller 344(2) and the power management controller 346(2).

With continuing reference to FIG. 4, the security and management controller 344(1) of the boot processor 336(1) of the master CPU 306(1) issues a release reset signal 348(1) to the power management controller 346(1) to continue performing hardware boot-up tasks including a power management boot-up tasks for the CPU 306(1) (number 9). The master and slave CPUs 306(1), 306(2) may continue to communicate to continue coordination of boot-up operations. To speed up this communication, the security and management controller 344(1) of the boot processor 336(1) of the master CPU 306(1) may setup a high speed sideband communication channel 350 over the sideband communication link 328 between the CPU 306(1), 306(2) (number 10).

The CPU 306(1) can then continue performing boot-up operations and tasks based on execution of the loaded bootloader program 318(1), which can include requesting boot components to be measured. For example, execution of the loaded bootloader program 318(1) may cause the master CPU 306(1) to setup the sideband communication channel 326 for communicating to the slave CPU 306(2). The master CPU 306(1) is configured to communicate the slave boot-up synchronization signal 330 to the slave CPU 306(2) as part of the process when executing the loaded bootloader program 318(1). Thus, the loading of the bootloader program 318(1) by the master CPU 306(1) by execution of the lower-level boot ROM program 332(1) is completed before the bootloader program 318(1) can be executed to then communicate the slave boot-up synchronization signal 330 to the slave CPU 306(2).

With continuing reference to FIG. 4, the application processors 338(1), 338(2) of the master and slave CPUs 306(1), 306(2) also need to perform an application boot-up operation. However, in this example, the application processors 338(1), 338(2) need respective application program code to perform application boot-up tasks and to be able to execute applications thereafter. For example, it may be necessary to load an operation system image into a CPU core 340, such as CPU core 340(1), to be executed to perform application boot-up tasks and to be able to support and manage the other CPU cores 340(1)-340(160) executing program code for applications. In this regard, the security and management controller 344(1) is configured to load an application image 352 of application program code from a memory 353 that stores the application image, such as a flash memory (number 11). The flash memory can be erased and reprogrammed to update the application image over time, as desired. The security and management controller 344(1) then provides the loaded application image 352 through the power management controller 346(1) to the CPU core 340(1) in the CPU 306(1) (number 12). The power management controller 346(1) issues a release signal 359 to cause the CPU core 340(1) to initiate an application boot-up operation through execution of the loaded application image 352 (number 13). Other application program codes that can be used for other application boot-up tasks, such as to initialize interfaces and memory, such as the system memories 324(1), 324(2) can also be loaded by the CPU core 340(1) from memory 353 (number 14). The CPU core 340(1) is configured to execute the program code in the loaded application image 352 to boot-up an operating system to support and manage the other CPU cores 340(1)-340 (160) executing program code for applications in the multi-CPU computing system 300.

Other hardware boot-up tasks that can be performed by the CPUs 306(1), 306(2) can include the initialization of shared computing sources, such as the system memory 324(1), 324(2) connected to the respective CPU sockets 302(1), 302(2), which are also boot components that can be requested to be measured to update the respective vCRs 358(1), 358(2). For example, a hardware boot-up tasks that can be performed by the CPUs 306(1), 306(2) can include the initialization of clock circuits, including phase-locked loop (PLL) circuits that control the frequencies of generated clock signals, which are also boot components that can be requested to be measured to update the respective vCRs 358(1), 358(2). Another example of a hardware boot-up tasks that can be performed by the CPUs 306(1), 306(2) can include the initialization of local power rails, operating voltage levels, clock signals, and signal interfaces, such as PCIe lanes and related devices, which are also boot components that can be requested to be measured to update the respective vCRs 358(1), 358(2). An example of another CPU application boot-up tasks that can be performed by the CPUs 306(1), 306(2) can include the initialization of shared computing sources, such as the system memory 324(1), 324(2) connected to the respective CPU sockets 302(1), 302(2), which are also boot components that can be requested to be measured to update the respective vCRs 358(1), 358(2). As another example, execution of the bootloader program 318(1) can be designed to cause the master CPU 306(1) to verify, initialize, and/or test the system memory 324(1) connected to its respective CPU socket 302(1). Execution of the bootloader program 318(2) can also be designed to cause the slave CPU 306(2) to verify, initialize, and/or test the system memory 324(2) connected to its respective CPU socket 302(2), which is also boot components that can be requested to be measured to update the respective vCRs 358(2). The slave CPU 306(2) may be configured to report the verified and initialized system memory 324(2) connected to its CPU socket 302(2), and vice versa, so that each CPU 306(1), 306(2) can use this information to form a global memory map for the entire multi-CPU computing system 300 to utilize the system memories 324(1), 324(2) as a global memory space.

A single CPU computing system can also be configured to measure earlier, primitive boot components, prior to activation of a TPM, for enhanced security, and related methods and computer-readable media. In this regard, FIG. 5 is a block diagram of the exemplary computing system 500 that includes one (1) CPU chip socket 502 ("CPU socket 502") (labeled CPU SOCKET 1). The CPU socket 502 is configured to support a CPU chip 504. The CPU chip 504 includes a CPU 506 that includes a respective secure boot processing system 508 configured to perform boot-up operations for the CPU 506. The CPU 506 is configured to receive a first reset signal 512 that is based on a power-on-reset (POR) signal on a respective master reset port 514 indicating a boot-up state, such as in response to a power cycle for example. In response to the reset signal 512 indicating the boot-up state, the CPU 506 is configured to perform a CPU boot-up operation. The secure boot processing system 508 is configured to perform boot-up tasks based on boot components. For example, one boot component may be a boot read-only memory (ROM) program that is executed by a secure processor in the secure boot processing system 508 to perform boot-up operations in response to the reset signal 512. Other boot components may include boot mode registers and other configurations that are used to perform boot-up operations. The secure boot processing system 508 can be designed to perform immutable boot-up tasks in a secure environment as part of a design to secure the boot-up operations of the computing system 500.

With continuing reference to FIG. 5, the computing system 500 also includes a TPM circuit 516 as part of a TPM protected environment 518. In this example, the TPM circuit 516 is a separate integrated circuit (IC) chip that is provided as a separate co-processor to the CPU 506. The TPM circuit 516 is configured to perform boot measurements of boot components and/or other measurements as an extra layer of security that is complementary to a secure boot process performed by the secure boot processing system 508 in the CPUs 506. Secure boot relies on local attestation and authentication of the firmware binaries loaded into the computing system 500 in a boot-up operation and executed to continue to perform boot-up tasks in a boot-up operation. However, measured boot performs remote or local attestation (i.e., measurement) of the platform integrity of the computing system 500. Examples of validation of platform integrity include validating boot flow (i.e., order of image load and boot related events), validation of boot configuration, validation of platform configuration (e.g., interfaces), and validation of platform devices (e.g., read-only memories (ROMs)). These boot integrity measurements are updated in a TPM CR 520 that can be used to determine intrusions. If a TPM CR value 519 stored in the TPM CR 520 does not match an expected value at each stage of the boot-up process in the CPU 506, this means one or more boot components of the CPU 506 may have been compromised.

To update the TPM CR 520 in a boot-up operation, the TPM circuit 516 is requested by the CPU 506 to perform a boot measurement on a new (next) boot component to be measured as part of boot-up operations performed by the secure boot processing system 508. The TPM circuit 516 performs a boot measurement of a boot component in one example by taking a digest (e.g., a one-way hash using an algorithm such as SHA-1) of the boot component using a hash algorithm to create a current CR value for the measured boot component. The current CR value is then used to update the existing TPM CR value 519 stored in a TPM CR 520. In this regard, in an example, a digest is taken of the current CR value for the boot component concatenated with the existing TPM CR value 519 in the respective TPM CR 520 in a CR extend operation to create a new CR value that is stored overtop the prior, existing TPM CR value 519 in the TPM CR 520. For example, the TPM CR 520 may be a platform configuration register (PCR) according to the TPM standard ISO/IEC 11889 based on various specifications defined by the Trusted Computing Group (TCG). As an example, the digest may be based on the SHA-1 hash algorithm to produce a 20-bit PCR value. By using a boot measurement of a current boot component to generate a CR value that is used to update an existing TPM CR value 519 stored in the TPM CR 520, an infinite number of boot measurements can be represented in a single CR value stored in a TPM CR 520 for the CPU 506 with no boot measurements having to be discarded to make room for newer boot measurements. The TPM CR value 519 stored in the TPM CR 520 can be compared, locally or remotely, to known expected values at any respective stage of the boot-up operation to determine improper modifications in the boot components of the CPU 506.

However, the TPM circuit 516 that can be used perform boot measurement for boot components of the secure boot processing system 508 in the CPU 506 for attestation of platform integrity may not be available as a resource during initial stages of a boot-up operation in the CPU 506. The TPM circuit 516 has to be brought up in a TPM protected environment 518 as part of a boot-up operation after initial stages and configuration boot-up tasks are performed by the CPU 506 that are necessary in order for the TPM circuit 516 to be available and ready to perform boot measurements. For example, CPU 506 can generate a reset signal 522 to cause the TPM circuit 516 to be initialized and booted as part of a boot-up operation to made available to perform boot measurements. This allows the TPM circuit 516 to be available and ready to perform boot measurements when requested by the CPU 506 to measure the platform integrity of the secure boot processing system 508 of the CPU 506. However, the boot-up process performed by the secure boot processing system 508 in the CPU 506 may need to perform earlier, more primitive boot-up tasks and operations before a boot-up task can be performed that generates the reset signal 512 to boot-up the TPM circuit 516 to be available for boot measurement. For example, the secure boot processing system 508 in the CPU 506 may need to first execute the immutable ROM program to perform certain earlier, more primitive boot-up tasks, as well as performing a boot-up task to load in a bootloader program to be executed to continue performing higher level boot-up tasks.

In this regard, in the computing system 500 in FIG. 5, the measured boot process performed by the TPM circuit 516 is extended to earlier, primitive boot components of the secure boot processing system 508 in the CPU 506 that are performed before the TPM circuit 516 becomes available to perform boot measurements. The secure boot processing system 508 in the CPU 506 is configured to measure their respective earlier, primitive boot components (e.g., loaded images, boot configurations, and boot mode registers) independent of the TPM circuit 516. The secure boot processing system 508 is configured to execute program code (e.g., an immutable boot ROM program) to perform a boot measurement based on the boot measurement scheme employed by the TPM circuit 516 and described above. In this regard, the CPU 506 includes a virtual CR (vCR) digest 524 that is configured to generate a vCR value 526 stored in a respective vCR 528 for a boot component 530 provided by the CPU 506. The vCR value 526 is initially set to zero in this example before boot measurements are used to update the vCR value 526. The vCR 528 is a physical register in the vCR digest 524, but is "virtual" in that it is updated outside of the TPM protected environment 518 where the TPM CR 520 for the TPM circuit 516 is located.

With continuing reference to FIG. 5, the vCR digest 524 is called up by the secure boot processing system 508 of the CPU 506 to perform a boot measurement of a boot component 530 as part of its boot-up operation. The vCR digest 524 takes a digest of the boot component 530 using a hashing algorithm (e.g., SHA-1) to generate a current CR value for the measured boot component 530. The current CR value is used to update the existing vCR value 526 stored in the vCR 528. In this regard, a digest is also taken of the current CR value generated for the boot component concatenated with the existing vCR value 526 stored in the vCR 528 in a CR extend operation to create a new vCR value 526 that is stored overtop the prior, existing vCR value 526 in the vCR 528. For example, the vCR 528 may be PCRs according to the TPM standard ISO/IEC 11889 based on various specifications defined by the Trusted Computing Group (TCG). The digest taken may be based on the SHA-1 algorithm to produce a 20-bit PCR value. By using a boot measurement of a current boot component to generate a CR value that is used to update the existing vCR value 526 stored in the vCR 528, an infinite number of boot measurements can be represented in a single vCR value 526 stored in a respective vCR 528 for a CPU 506 with no boot measurements having to be discarded to make room for newer boot measurements.

Once the TPM circuit 516 is initialized and available for use, the TPM circuit 516 can perform boot measurements to update the TPM CR value 519 in the TPM CR 520, as discussed above. In the example computing system 500 in FIG. 5, it is desired to preserve the integrity of the secure boot processing system 508 and its boot-up operations end-to-end. What this means is that it desired to perform and update a respective CR value for the CPU 506 based on boot measurement on both the earlier, primitive boot components encountered before the TPM circuit 516 is available as well as perform and update a respective CR value based on the boot measurements for boot components encountered after the TPM circuit 516 is available. In this manner, as shown in FIG. 5, in this example, the vCR value 526 can be communicated as a final merged vCR value 526F representing the collective boot measurements of the boot components in the respective secure boot processing system 508 in the CPU 506. The final vCR value 526F can be provided to the TPM circuit 516 through a TPM circuit interface 534. The TPM circuit 516 can use the final vCR value 526F as the initial TPM CR value 519, as opposed to an initial zero CR value for example. The TPM circuit 516 can then continue to update the TPM CR 520 with the TPM CR value 519 based on the measured boot components from the secure boot processing system 508, which can then be authenticated locally or remotely.

In this manner, the circuits and operations of the TPM circuit 516 to update CR values based on boot measurements include boot measurement information from the earlier, primitive boot components performed by the secure boot processing system 508, including before the TPM circuit 516 was available. This allows the TPM circuit 516 to preserve the integrity of the boot-up operation of the computing system 500 without there being a gap in security between the occurrence of the reset signal 512 and when the TPM circuit 516 becomes available to perform boot measurements of boot components.

FIG. 6 is a flowchart illustrating an exemplary primitive boot measurement process 600 performed in the secure boot processor system 508 of the CPU 506 in FIG. 5. The primitive boot measurement process 600 virtually measures earlier, primitive boot components and updates a vCR value 526 that can be used by the TPM circuit 516 as the initial TPM CR value 519. In this regard, with reference to FIG. 6, a first step in the process is the CPU 506 receiving a first reset signal 512 (block 602 in FIG. 6). In response to the reset signal 512 indicating a boot-up state (block 604 in FIG. 6), a next step is the CPU 506 accessing one or more boot components 530 (block 606 in FIG. 6). For each accessed boot component 530 among the one or more boot components 530 (block 608 in FIG. 6), a next step is the CPU 506 performing a boot measurement on the accessed boot component 530 to generate a CR value (block 610 in FIG. 6), and updating an existing CR value 526 stored in a CR 528 based on the generated first CR value (block 612 in FIG. 6). In response to a second reset signal 522 indicating a boot-up state (block 614 in FIG. 6), a next step is the TPM circuit 516 receiving the existing CR value 526 and storing the existing CR value 526 as the initial TPM CR value 519 in the TPM CR 520. A next step is the TPM circuit 516 accessing one or more subsequent boot components 530 (block 616 in FIG. 6). For each accessed subsequent boot component 530 among the one or more subsequent boot components 530 (block 618 in FIG. 6), a next step is the TPM circuit 516 performing a subsequent boot measurement on the accessed subsequent boot component 530 to generate a TPM CR value (block 620 in FIG. 6), and updating a TPM CR value 519 stored in a TPM CR 520 based on the generated TPM CR value (block 622 in FIG. 6).

FIG. 7 is a block diagram illustrating an example of a processor-based system 700 that can include a secure boot processing system 702, such as the secure boot processing systems 108(1)-108(N), 337(1), 337(2) and 508 in FIGS. 1 and 3-5, as non-limiting examples. The secure boot processing system 702 can be configured to measure earlier, primitive boot components and update a virtual CR value that can be provided as an initial CR value to be used by the TPM circuit 704, when available, to perform and record boot measurements of subsequent boot components to protect the integrity of boot-up operations. In this example, the processor-based system 700 includes a processor 706 that includes one or more CPUs 708. The CPU(s) 708 is coupled to a system bus 710 and can intercouple initiator and target devices included in the processor-based system 700. As is well known, the CPU(s) 708 communicates with these other devices by exchanging address, control, and data information over the system bus 710. For example, the CPU(s) 708 can communicate bus transaction requests to a memory controller 712 as an example of a target device as part of a memory system 718. Although not illustrated in FIG. 7, multiple system buses 710 could be provided, wherein each system bus 710 constitutes a different fabric.

Other initiator and target devices can be connected to the system bus 710. As illustrated in FIG. 7, these devices can include the memory system 718, one or more input devices 720, one or more output devices 722, one or more network interface devices 724, and one or more display controllers 726, as examples. The input device(s) 720 can include any type of input device, including, but not limited to, input keys, switches, voice processors, etc. The output device(s) 722 can include any type of output device, including, but not limited to, audio, video, other visual indicators, etc. The network interface device(s) 724 can be any devices configured to allow exchange of data to and from a network 728. The network 728 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 724 can be configured to support any type of communications protocol desired. The memory system 718 can include the memory controller 712 coupled to one or more memory arrays 730 to store data.

The CPU(s) 708 may also be configured to access the display controller(s) 726 over the system bus 710 to control information sent to one or more displays 732. The display controller(s) 726 sends information to the display(s) 732 to be displayed via one or more video processors 734, which process the information to be displayed into a format suitable for the display(s) 732. The display(s) 732 can include any type of display, including, but not limited to, a cathode ray tube (CRT), a liquid crystal display (LCD), a plasma display, a light emitting diode (LED) display, etc.

The processor-based system 700 in FIG. 7 may include a set of instructions 736 that may include conditional control instructions that cause such instructions to either be CI instructions or CD instructions. The instructions 736 may be stored in the memory array 730 or the processor 706 as examples of non-transitory computer-readable medium 738. The instructions 736 may also reside, completely or at least partially, within the memory system 718 and/or within the processor 702 during their execution. The instructions 736 may further be transmitted or received over the network 728 via the network interface device 724, such that the network 728 includes the non-transitory computer-readable medium 738.

While the non-transitory computer-readable medium 738 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The initiator devices and target devices described herein may be employed in any circuit, hardware component, integrated circuit (IC), or IC chip, as examples. A processor is a circuit that can include a microcontroller, a microprocessor, or other circuit that can execute software or firmware instructions. A controller is a circuit that can include microcontroller, a microprocessor, and/or dedicated hardware circuits (e.g., a field programmable gate array (FPGA) that do not necessarily execute software or firmware instruction. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A multiple (multi-) central processing unit (CPU) computing system, comprising:
    a trusted platform module (TPM) circuit comprising a TPM configuration register (CR);
    a first CPU comprising a first CR, the first CPU configured to, in response to a first reset signal indicating a boot-up state:
        access one or more first boot components; and
        for each accessed first boot component among the one or more first boot components:
            perform a first boot measurement on the accessed first boot component to generate a first CR value; and
            update a first existing CR value stored in the first CR based on the generated first CR value; and
    a second CPU comprising a second CR register, the second CPU configured to, in response to a second reset signal indicating the boot-up state:
        access one or more second boot components; and
        for each accessed second boot component among the one or more second boot components:
            perform a second boot measurement on the accessed second boot component to generate a second CR value; and
            update a second existing CR value stored in the second CR based on the generated second CR value;
    the first CPU further configured to:
        merge the first existing CR value and the second existing CR value into a merged CR value; and
        communicate the merged CR value to the TPM circuit to be used as an initial CR value to measure subsequent boot components;
    the TPM circuit configured to:
        store the merged CR value as an existing TPM CR value in the TPM CR;
        access one or more subsequent boot components; and
        for each accessed subsequent boot component among the one or more subsequent boot components:
            perform a subsequent boot measurement on the accessed subsequent boot component to generate a subsequent TPM CR value; and
            update the existing TPM CR value stored in the TPM CR based on the generated subsequent TPM CR value.

2. The multi-CPU computing system of claim 1, wherein:
    the first CPU comprises one or more first CPU cores, and a first secure boot processing system comprising a first boot processor;
    the second CPU comprises one or more second CPU cores, and a second secure boot processing system comprising a second boot processor;
    the first boot processor is configured to, in response to the first reset signal indicating the boot-up state:
        access the one or more first boot components; and
        for each accessed first boot component among the one or more first boot components:
            perform the first boot measurement on the accessed first boot component to generate the first CR value; and
            update the first existing CR value stored in the first CR based on the generated first CR value; and
    the second boot processor is configured to, in response to the second reset signal indicating the boot-up state:
        access the one or more second boot components; and
        for each accessed second boot component among the one or more second boot components:
            perform the second boot measurement on the accessed second boot component to generate the second CR value; and
            update the second existing CR value stored in the second CR based on the generated second CR value.

3. The multi-CPU computing system of claim 2, wherein:
    the first CR is inaccessible by the one or more first CPU cores; and
    the second CR is inaccessible by the one or more second CPU cores.

4. The multi-CPU computing system of claim 1, wherein:
    the first CPU further comprises a first boot read-only-memory (ROM) storing a first boot ROM program; and
    the second CPU further comprises a second boot ROM storing a second boot ROM program;
    the first CPU configured to, in response to the first reset signal indicating the boot-up state, execute the first boot ROM program in the first boot ROM to:
        access the one or more first boot components; and
        for each accessed first boot component among the one or more first boot components:
            perform the first boot measurement on the accessed first boot component to generate the first CR value; and
            update the first existing CR value stored in the first CR based on the generated first CR value.

5. The multi-CPU computing system of claim 4, wherein:
    the first CPU is further configured to, in response to the first reset signal indicating the boot-up state, execute the first boot ROM program in the first boot ROM to:
        load in a first bootloader program from an external memory as a first boot component among the one or more first boot components; and
        access the first bootloader program as an accessed first boot component among the one or more first boot components; and
    the second CPU is further configured to, in response to the second reset signal indicating the boot-up state, execute the second boot ROM program in the second boot ROM to:
        load in a second bootloader program from a second external memory as a second boot component among the one or more second accessed boot components; and
        access the second bootloader program as an accessed second boot component among the one or more second accessed boot components.

6. The multi-CPU computing system of claim 4, wherein:
    a first boot component among the one or more first boot components comprises the first boot ROM; and
    a second boot component among the one or more second boot components comprises the second boot ROM.

7. The multi-CPU computing system of claim 1, further comprising:
    a board management controller (BMC) configured to generate a power-on-reset (POR) signal in response to a power cycle or reset of the computing system;
    the first CPU is configured to receive the first reset signal in response to the BMC generating the POR signal; and
    the second CPU is configured to receive the second reset signal in response to the BMC generating the POR signal.

8. The multi-CPU computing system of claim 1, wherein:
the first CPU is further configured to, in response to the first reset signal indicating the boot-up state, reset the first existing CR value to zero; and
the second CPU is further configured to, in response to the second reset signal indicating the boot-up state, reset the first existing CR value to zero.

9. The multi-CPU computing system of claim 1, wherein:
the first CR comprises a first platform CR (PCR); and
the second CR comprises a second platform CR (PCR).

10. The multi-CPU computing system of claim 9, wherein:
the first CPU is configured to:
perform the first boot measurement by being configured to: generate the first CR value of the accessed first boot component based on performing a first digest of the first boot component based on a CR digest; and
update the first existing CR value by being configured to: perform a second digest on the first existing CR value stored in the first PCR, concatenated with the generated first CR value, based on the CR digest; and
the second CPU is configured to:
perform the second boot measurement by being configured to: generate the second CR value of the accessed second boot component based on performing a third digest of the second boot component based on the CR digest; and
update the first existing CR value by being configured to: perform a fourth digest on the second existing CR value stored in the second PCR, concatenated with the generated second CR value, based on the CR digest.

11. The multi-CPU computing system of claim 1, wherein:
the first CR comprises a first virtual CR; and
the second CR comprises a second virtual CR.

12. The multi-CPU computing system of claim 1, wherein:
the first CPU is further configured to, in response to the second reset signal indicating the boot-up state, communicate a slave boot-up synchronization signal indicating the boot-up state on a sideband communication channel coupled to the second CPU; and
the second CPU is further configured to receive the slave boot-up synchronization signal as the second reset signal.

13. The multi-CPU computing system of claim 1, further comprising:
a third CPU comprising a third configuration register (CR), the third CPU configured to, in response to a third reset signal indicating the boot-up state:
access one or more third boot components; and
for each accessed third boot component among the one or more third boot components:
perform a third boot measurement on the accessed third boot component to generate a third CR value; and
update a third existing CR value stored in the third CR based on the generated third CR value; and
the first CPU configured to:
merge the first existing CR value, the second existing CR value, and the third existing CR value into a merged CR value.

14. The multi-CPU computing system of claim 1, wherein the TPM circuit comprises a TPM processor.

15. The multi-CPU computing system of claim 1, wherein the TPM circuit comprises the first CPU configured to execute TPM firmware.

16. The multi-CPU computing system of claim 1, wherein:
the first CPU further configured to:
in response to the first reset signal indicating the boot-up state, execute a first boot component among the one or more first boot components to boot-up the TPM circuit; and
the TPM circuit configured to, in response to being booted-up by the first CPU:
store the merged CR value as an existing TPM CR value in the TPM CR;
access the one or more subsequent boot components; and
for each accessed subsequent boot component among the one or more subsequent boot components:
perform the subsequent boot measurement on the accessed subsequent boot component to generate the subsequent TPM CR value; and
update the existing TPM CR value stored in the TPM CR based on the generated subsequent TPM CR value.

17. A method of performing a secure boot process in a multiple (multi-) central processing unit (CPU) computing system, comprising:
receiving a first reset signal;
in response to the first reset signal indicating a boot-up state, a first CPU:
accessing one or more first boot components; and
for each accessed first boot component among the one or more first boot components:
performing a first boot measurement on the accessed first boot component to generate a first configuration register (CR) value; and
updating a first existing CR value stored in a first CR based on the generated first CR value; and
receiving a second reset signal;
in response to the second reset signal indicating the boot-up state, a second CPU:
accessing one or more second boot components; and
for each accessed second boot component among the one or more second boot components:
performing a second boot measurement on the accessed second boot component to generate a second CR value; and
updating a second existing CR value stored in a second CR based on the generated second CR value;
merging the first existing CR value and the second existing CR value into a merged CR value;
communicating the merged CR value to a trust platform module (TPM) circuit to be used as an initial CR value to measure subsequent boot components;
storing in a TPM CR in the TPM circuit, the merged CR value as an existing TPM CR value;
accessing, in the TPM circuit, one or more subsequent boot components; and
for each accessed subsequent boot component among the one or more subsequent boot components:
performing, in the TPM circuit, a subsequent boot measurement on the accessed subsequent boot component to generate a subsequent TPM CR value; and updating, in the TPM circuit, the existing TPM CR value stored in the TPM CR based on the generated subsequent TPM CR value.

18. The method of claim 17, further comprising:
the first CPU, in response to the first reset signal indicating the boot-up state:
  executing a first boot read-only memory (ROM) program in a first boot ROM for:
    accessing the one or more first boot components; and
    for each accessed first boot component among the one or more first boot components:
      performing the first boot measurement on the accessed first boot component to generate the first CR value; and
      updating the first existing CR value stored in the first CR based on the generated first CR value; and
the second CPU, in response to the second reset signal indicating the boot-up state:
  executing the second boot ROM program in a second boot ROM for:
    accessing the one or more second boot components; and
    for each accessed second boot component among the one or more second boot components:
      performing the second boot measurement on the accessed second boot component to generate the second CR value; and
      updating the second existing CR value stored in the second CR based on the generated second CR value.

19. The method of claim 18, comprising:
the first CPU, in response to the first reset signal indicating the boot-up state, executing the first boot ROM program in the first boot ROM for:
  loading in a first bootloader program from an external memory as a first boot component among the one or more first boot components; and
  accessing the first bootloader program as an accessed first boot component among the one or more first boot components; and
the second CPU, in response to the second reset signal indicating the boot-up state, executing the second boot ROM program in the second boot ROM for:
  loading in a second bootloader program from a second external memory as a second boot component among the one or more second accessed boot components; and
  accessing the second bootloader program as an accessed second boot component among the one or more second accessed boot components.

20. The method of claim 17, wherein:
performing the first boot measurement comprises generating the first CR value of the accessed first boot component based on performing a first digest of the first boot component based on a CR digest;
updating the first existing CR value comprises performing a second digest on the first existing CR value stored in the first platform configuration register (PCR), concatenated with the generated first CR value, based on the CR digest;
performing the second boot measurement comprises generating the second CR value of the accessed second boot component based on performing a third digest of the second boot component based on the CR digest; and
updating the first existing CR value comprises performing a fourth digest on the second existing CR value stored in the second PCR, concatenated with the generated second CR value, based on the CR digest.

21. The method of claim 17, further comprising:
the first CPU, in response to the second reset signal indicating the boot-up state, communicating a slave boot-up synchronization signal indicating the boot-up state on a sideband communication channel coupled to the second CPU; and
the second CPU receiving the slave boot-up synchronization signal as the second reset signal.

22. The method of claim 17, further comprising:
in response to a third reset signal indicating the boot-up state, a third CPU:
  accessing one or more third boot components; and
  for each accessed third boot component among the one or more third boot components:
    performing a third boot measurement on the accessed third boot component to generate a third CR value; and
    updating a third existing CR value stored in the third CR based on the generated third CR value; and
  comprising merging the first existing CR value, the second existing CR value, and the third existing CR value into the merged CR value.

23. A multiple (multi-) central processing unit (CPU) computing system, comprising:
a first CPU comprising a first configuration register (CR), the first CPU configured to, in response to a first reset signal indicating a boot-up state:
  access one or more first boot components; and
  for each accessed first boot component among the one or more first boot components:
    generate a first CR value of the accessed first boot component based on performing a first digest of the first boot component based on a CR digest; and
    update the first existing CR value based on performing a second digest on the first existing CR value concatenated with the generated first CR value, based on the CR digest;
a second CPU comprising a second CR register, the second CPU configured to, in response to a second reset signal indicating a boot-up state:
  access one or more second boot components; and
  for each accessed second boot component among the one or more second boot components:
    generate a second CR value of the accessed second boot component based on performing a third digest of the second boot component based on a CR digest; and
    update the second existing CR value based on performing a fourth digest on the second existing CR value concatenated with the generated second CR value, based on the CR digest;
the first CPU further configured to:
  merge the first existing CR value and the second existing CR value into a merged CR value; and
  communicate the merged CR value to a trust platform module (TPM) circuit to be used as an initial CR value to measure subsequent boot components.

24. The multi-CPU computing system of claim 23, wherein:
the first CR is inaccessible by the first CPU; and
the second CR is inaccessible by the second CPU.

25. The multi-CPU computing system of claim 23, wherein:
the first CR comprises a first virtual CR; and
the second CR comprises a second virtual CR.

26. The multi-CPU computing system of claim 23, wherein:
  the first CPU is further configured to, in response to the second reset signal indicating the boot-up state, communicate a slave boot-up synchronization signal indicating the boot-up state on a sideband communication channel coupled to the second CPU; and
  the second CPU is further configured to receive the slave boot-up synchronization signal as the second reset signal.

27. A multiple (multi-) central processing unit (CPU) computing system, comprising:
  a first CPU comprising a first configuration register (CR), the first CPU configured to, in response to a first reset signal indicating a boot-up state:
    perform a first boot measurement on a first boot read-only-memory (ROM) accessible to the first CPU to generate a first CR value; and
    update a first existing CR value stored in the first CR based on the generated first CR value; and
  a second CPU comprising a second CR register, the second CPU configured to, in response to a second reset signal indicating the boot-up state:
    perform a second boot measurement on a second boot ROM accessible to the second CPU to generate a second CR value; and
    update a second existing CR value stored in the second CR based on the generated second CR value;
  the first CPU further configured to:
    merge the first existing CR value and the second existing CR value into a merged CR value; and
    communicate the merged CR value to a trust platform module (TPM) circuit to be used as an initial CR value to measure subsequent boot components;
  the first CPU is further configured to, in response to the second reset signal indicating the boot-up state, communicate a slave boot-up synchronization signal indicating the boot-up state on a sideband communication channel coupled to the second CPU; and
  the second CPU is further configured to receive the slave boot-up synchronization signal as the second reset signal.

28. The multi-CPU computing system of claim 27, wherein:
  the first CR is inaccessible by the first CPU; and
  the second CR is inaccessible by the second CPU.

29. The multi-CPU computing system of claim 27, wherein:
  the first CR comprises a first virtual CR; and
  the second CR comprises a second virtual CR.

30. A multiple (multi-) central processing unit (CPU) computing system, comprising:
  a first CPU comprising a first configuration register (CR), the first CPU configured to, in response to a first reset signal indicating a boot-up state, execute a first boot read-only-memory (ROM) program in a first boot ROM to:
    load in a first bootloader program from an external memory as a first boot component among the one or more first boot components;
    perform a first boot measurement on the first bootloader program to generate a first CR value; and
    update a first existing CR value stored in the first CR based on the generated first CR value; and
  a second CPU comprising a second CR register, the second CPU configured to, in response to a second reset signal indicating the boot-up state, execute a second boot ROM program in the second boot ROM to:
    load in a second bootloader program from a second external memory as a second boot component among the one or more second boot components;
    perform a second boot measurement on the second bootloader program to generate a second CR value; and
    update a second existing CR value stored in the second CR based on the generated second CR value; and
  the first CPU further configured to:
    merge the first existing CR value and the second existing CR value into a merged CR value; and
    communicate the merged CR value to a trust platform module (TPM) circuit to be used as an initial CR value to measure subsequent boot components.

31. The multi-CPU computing system of claim 30, wherein the second external memory is the first external memory.

32. The multi-CPU computing system of claim 30, wherein:
  the first CR is inaccessible by the first CPU; and
  the second CR is inaccessible by the second CPU.

33. The multi-CPU computing system of claim 30, wherein:
  the first CR comprises a first virtual CR; and
  the second CR comprises a second virtual CR.

34. The multi-CPU computing system of claim 30, wherein:
  the first CPU is further configured to, in response to the second reset signal indicating the boot-up state, communicate a slave boot-up synchronization signal indicating the boot-up state on a sideband communication channel coupled to the second CPU; and
  the second CPU is further configured to receive the slave boot-up synchronization signal as the second reset signal.

* * * * *